US012436533B2

(12) United States Patent
Nishii et al.

(10) Patent No.: US 12,436,533 B2
(45) Date of Patent: Oct. 7, 2025

(54) AUTONOMOUS TRAVEL METHOD, AUTONOMOUS TRAVEL SYSTEM, AND AUTONOMOUS TRAVEL PROGRAM

(71) Applicant: Yanmar Holdings Co., Ltd., Osaka (JP)

(72) Inventors: Yasuto Nishii, Okayama (JP); Masaaki Murayama, Okayama (JP); Akifumi Kuroda, Okayama (JP); Shinya Nishibeppu, Okayama (JP); Masahito Adachi, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 141 days.

(21) Appl. No.: 18/223,430

(22) Filed: Jul. 18, 2023

(65) Prior Publication Data
US 2024/0028037 A1    Jan. 25, 2024

(30) Foreign Application Priority Data

Jul. 19, 2022 (JP) ................................ 2022-114827
Jul. 19, 2022 (JP) ................................ 2022-114829

(51) Int. Cl.
*A01B 69/00* (2006.01)
*A01B 69/04* (2006.01)
*G05D 1/00* (2006.01)

(52) U.S. Cl.
CPC ......... *G05D 1/0212* (2013.01); *A01B 69/008* (2013.01); *G05D 1/0088* (2013.01)

(58) Field of Classification Search
CPC .. G05D 1/0212; G05D 1/0088; G05D 1/2246; G05D 1/2297; G05D 1/6482; G05D 2105/15; G05D 2107/21; G05D 2109/10; A01B 69/008; G01C 21/3629
See application file for complete search history.

(56) References Cited

FOREIGN PATENT DOCUMENTS

| EP | 3998516 A1 | 5/2022 | |
|---|---|---|---|
| JP | 2021-029218 A | 3/2021 | |
| JP | 2021087384 A * | 6/2021 | ............ A01B 69/00 |
| JP | 7009983 B2 * | 1/2022 | ............ A01B 69/00 |
| WO | WO-2017159801 A1 * | 9/2017 | ........... A01B 69/008 |

OTHER PUBLICATIONS

Extended European Search Report dated Jan. 4, 2024 issued in EP Application No. 23183499.5.

* cited by examiner

*Primary Examiner* — Calvin Cheung
(74) *Attorney, Agent, or Firm* — NORTON ROSE FULBRIGHT US LLP

(57) ABSTRACT

An autonomous travel system causes a work vehicle to autonomously travel along an inter-field route preset for a road connecting a field and a field. A travel processor causes the work vehicle to be stopped at a route start position of the inter-field route and to resume autonomous travel when a user is within a predetermined distance from the work vehicle in the field corresponding to the stop position of the work vehicle. An announcement process unit causes the work vehicle to announce travel information about travel on the inter-field route in the field.

20 Claims, 28 Drawing Sheets

| ROUTE ID | START FIELD | END FIELD | POSITION INFORMATION | SPEED INFORMATION |
|----------|-------------|-----------|----------------------|-------------------|
| R001 | F1 | F2 | Pf12 | Vf12 |
| R002 | F3 | F4 | Pf34 | Vf34 |
| ... | ... | ... | ... | ... |

E1

AUTONOMOUS TRAVEL METHOD, AUTONOMOUS TRAVEL SYSTEM, AND AUTONOMOUS TRAVEL PROGRAM

CROSS-REFERENCE TO RELATED APPLICATIONS

This application claims priority under 35 U.S.C. § 119 to JP Application No. 2022-114827 filed Jul. 19, 2022 and JP Application No. 2022-114829 filed Jul. 19, 2022 the entire contents of which are hereby incorporated by reference.

TECHNICAL FIELD

The present disclosure relates to an autonomous travel method, an autonomous travel system, and an autonomous travel program for causing a work vehicle to autonomously travel.

BACKGROUND ART

Conventionally, work vehicles, which can perform work while autonomously traveling within a field or autonomously travel between multiple fields, have been known (see Patent Document 1, for example).

PRIOR ART DOCUMENT

Patent Document

Patent Document 1: Japanese Patent Laid-open Publication No. 2021-29218

SUMMARY OF INVENTION

Technical Problem

When a work vehicle is to be traveled autonomously on a connecting road that connects one field and another field (e.g., a road, etc.), it is necessary to pay attention to safety of the connecting road in order to avoid such an accident that the work vehicle contacts with other vehicles or the like. In addition, the work vehicle is to be traveled autonomously on a connecting road that connects one field and another field (inter-field route), it is necessary to pay attention to safety of the inter-field route.

An object of the present disclosure is to provide an autonomous travel method, an autonomous travel system, and an autonomous travel program capable of improving safety and a traveling efficiency of a work vehicle autonomously traveling between multiple areas.

Solution to Problem

An autonomous travel method of the present disclosure is an autonomous travel method for causing a work vehicle to autonomously travel along an inter-area route preset for a connecting road connecting multiple areas. The autonomous travel method includes causing the work vehicle to be stopped at an end point of the inter-area route.

The autonomous travel system of the present disclosure is an autonomous travel system for causing a work vehicle to autonomously travel along an inter-area route preset for a connecting road connecting multiple areas. The autonomous travel system includes a travel processor. The travel processor causes the work vehicle to be stopped at the end point of the inter-area route.

The autonomous travel program of the present disclosure is an autonomous travel program for causing a work vehicle to autonomously travel along an inter-area route preset for a connecting road connecting multiple areas. The autonomous travel program is an autonomous travel program for causing one or more processors to execute a procedure including causing the work vehicle to be stopped at the end point of the inter-area route.

Advantageous Effects of Invention

According to the present disclosure, it is possible to provide an autonomous travel method, an autonomous travel system, and an autonomous travel program capable of improving safety and a traveling efficiency of a work vehicle autonomously traveling between multiple areas.

DESCRIPTION OF EMBODIMENTS

Embodiments described below are specific examples that embody the present disclosure and are not intended to limit the technical scope of the present disclosure.

Figure 1:
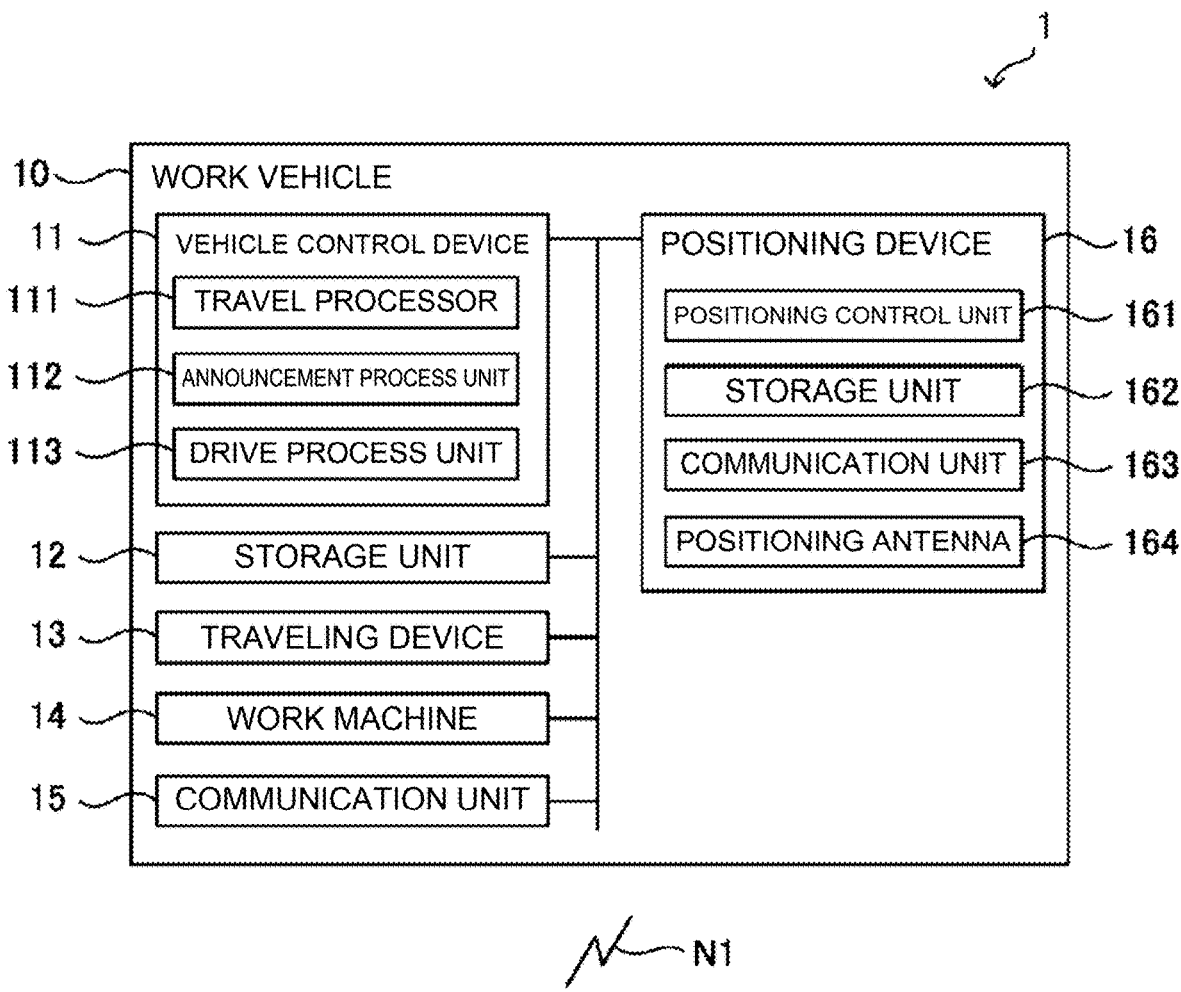
FIG. 1 is a block diagram illustrating a configuration of an autonomous travel system according to an embodiment of the present disclosure.
Figure 1:
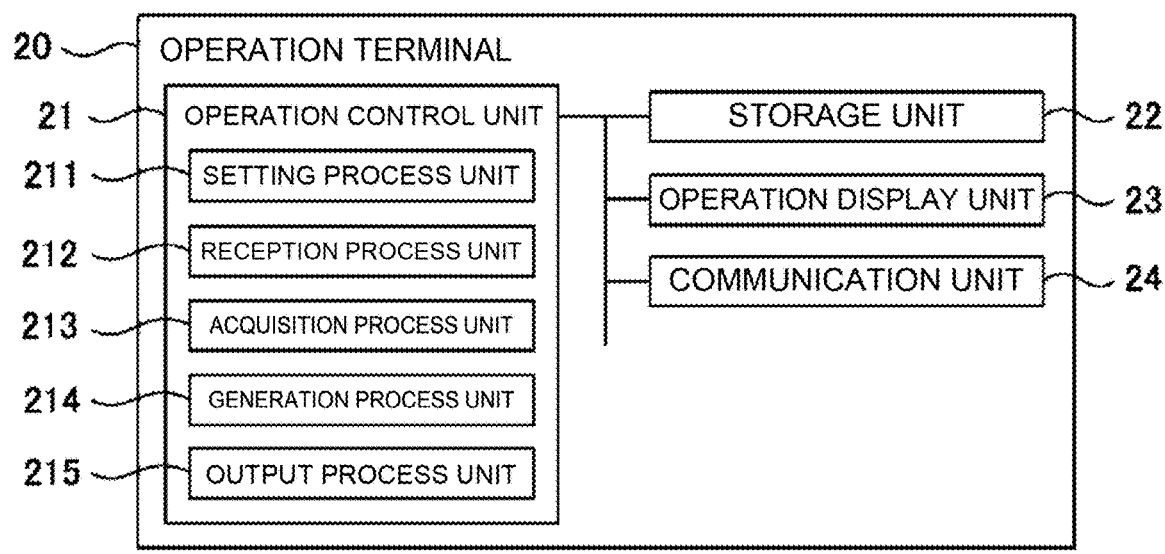

As illustrated in FIG. 1, an autonomous travel system 1 according to an embodiment of the present disclosure includes a work vehicle 10 and an operation terminal 20. The work vehicle 10 and the operation terminal 20 can communicate with each other via a communication network N1. For example, the work vehicle 10 and the operation terminal 20 can communicate with each other via a mobile phone line network, a packet line network, or a wireless LAN.

In this embodiment, a case where the work vehicle 10 is a tractor will be described as an example. As another embodiment, the work vehicle 10 may be a rice transplanter, a combine, a construction machine, a snowplow, or the like. The work vehicle 10 is provide with a configuration capable of traveling autonomously (autonomous travel) within a field in accordance with a predetermined target route. In addition, the work vehicle 10 can perform predetermined work while traveling autonomously in the field. Furthermore, the work vehicle 10 is configured to travel autonomously along a road connecting multiple fields (connecting road) according to a preset inter-field route. On the basis of current position information of the work vehicle 10 to be calculated by a positioning device 16, the work vehicle 10 travels autonomously in accordance with the target route and the inter-field route that are preset inside the field and outside the field (road).

Figure 3:
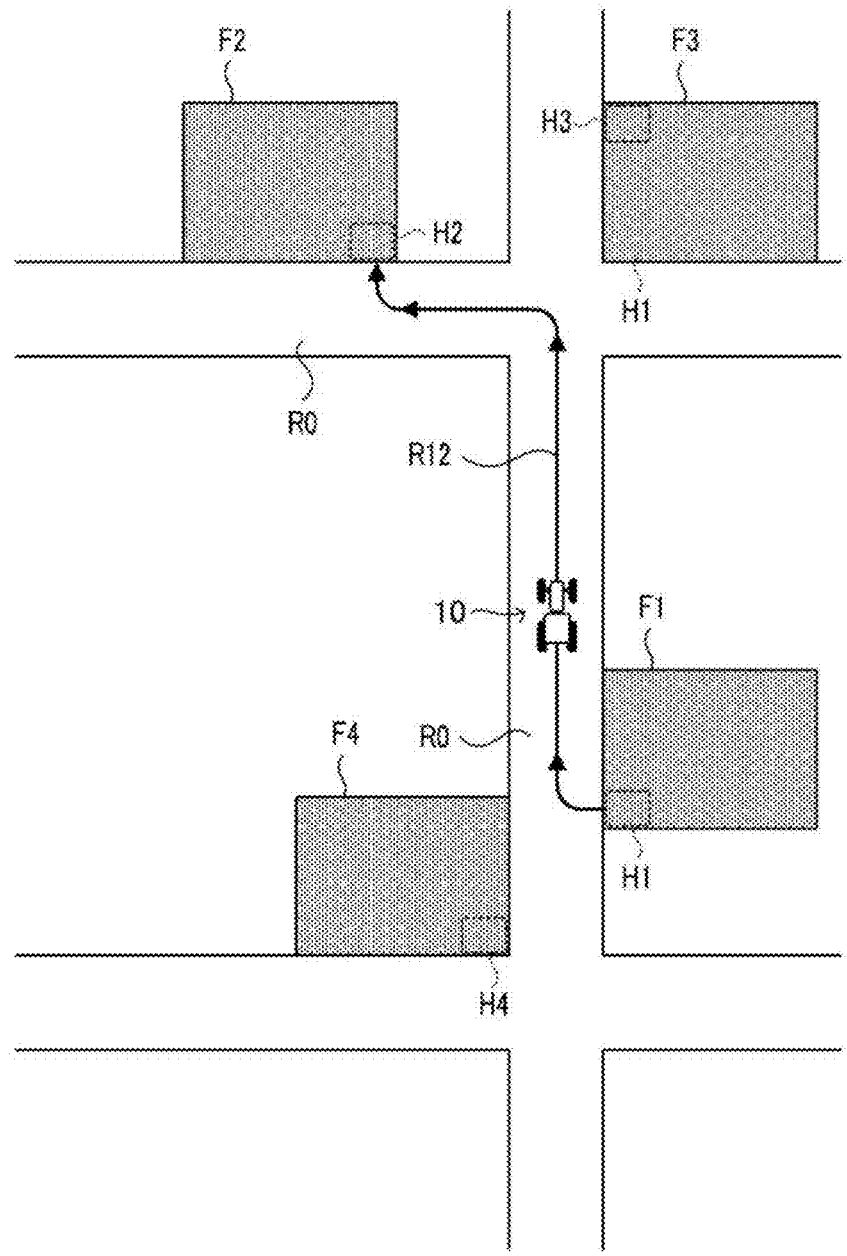
FIG. 3 is a diagram illustrating an example of an inter-field route of the work vehicle according to the embodiment of the present disclosure.
Figure 4A:
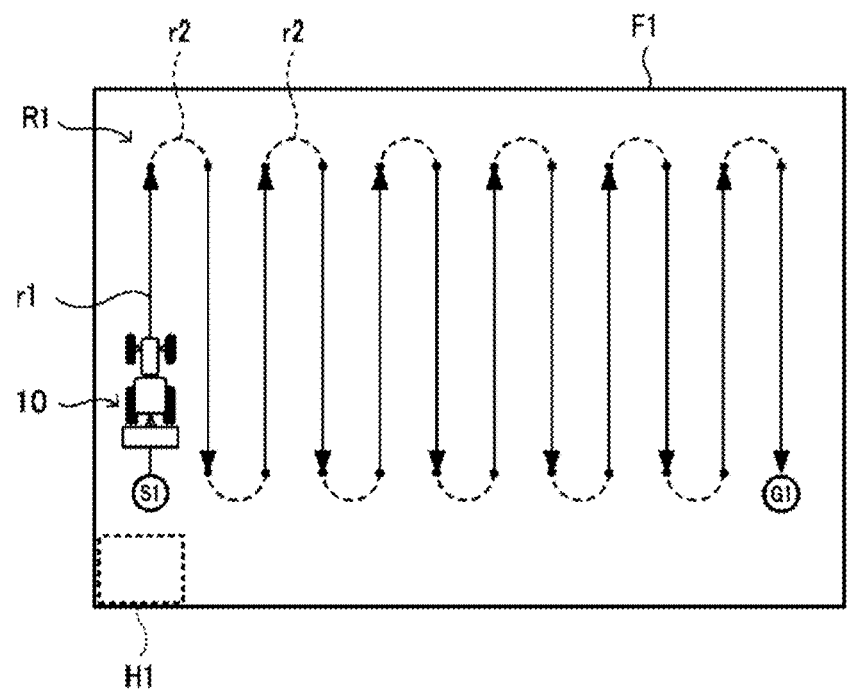
FIG. 4A is a diagram illustrating an example of a target route of the work vehicle according to the embodiment of the present disclosure.

For example, the work vehicle 10 performs a predetermined work in a field F1 shown in FIG. 3 and FIG. 4A while traveling autonomously along a preset target route R1 (work route). When the work in the field F1 is completed, the work vehicle 10 autonomously travels along a preset inter-field route R12 (moving route) on a road R0 to move to a field F2. For example, the work vehicle 10 autonomously travels along the inter-field route R12 that connects an entrance/exit H1 of the field F1 with an entrance/exit H2 of the field F2. When the work vehicle 10 arrives at the field F2, it performs the predetermined work in the field F2 (see FIGS. 3 and 4B) while traveling autonomously along a preset target route R2 (work route). The target route R1 in the field F1 and the target route R2 in the field F2 are set as appropriate according to task contents thereof, respectively. The inter-field route R12 of a road R0 is set according to operation by an operator (user) (teaching operation). In the present embodiment, although the inter-field route R12 on the road R0, along which the work vehicle 10 travels from the field F1 to the field F2, is describe as an example, the inter-field route R12 may be a route on the road R0 along which the work vehicle 10 travels from the field F2 to the field F1. When the work vehicle 10 travels over three or more fields in sequence, the inter-field routes may be set up for each pair of the fields. The inter-area route R12 is an example of an inter-field route of the present disclosure. The inter-area route of the present disclosure may not be a route for traveling between the fields (inter-area route), but a route only for traveling between a first point and a second point on the road R0 (point-to-point route). The first and second points may be locations designated by the user on a map.

The connecting road may be a work vehicle dedicated road or a general vehicle (e.g., passenger vehicle) travelable road, such as a farm road, a forest road, a public road, a private road, a motorway, and the like.

Work Vehicle 10

Figure 2:
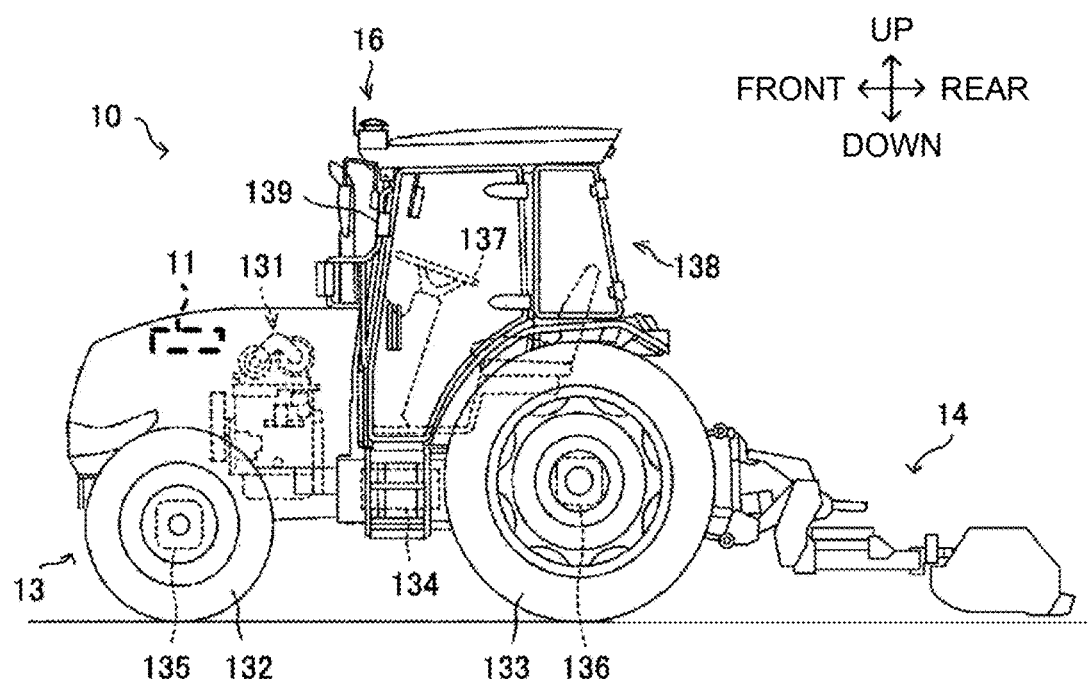
FIG. 2 is an external view illustrating an example of a work vehicle according to the embodiment of the present disclosure.

As shown in FIGS. 1 and 2, the work vehicle 10 has a vehicle control device 11, a storage unit 12, a traveling device 13, a work machine 14, a communication unit 15, a positioning device 16, and the like. The vehicle control device 11 is electrically connected to the storage unit 12, the traveling device 13, the work machine 14, the positioning device 16, and the like. The vehicle control device 11 and the positioning device 16 may be capable of performing wireless communication.

The communication unit 15 is a communication interface that connects the work vehicle 10 to the communication network N1 by wire or wirelessly, thereby to perform a data communication according to a predetermined communication protocol with external devices such as the operation terminal 20 via the communication network N1. The work vehicle 10 can communicate wirelessly with the operation terminal 20 via the communication unit 15.

The storage unit 12 is a non-volatile storage unit such as a HDD (hard disk drive) or a SSD (solid state drive) that stores various pieces of information. The storage unit 12 stores a control program, such as an autonomous travel program that causes the vehicle control device 11 to execute an autonomous travel process described later (see FIGS. 10, 11, 24, and 28). For example, the autonomous travel program is non-temporarily recorded in a computer-readable recording medium such as a flash ROM, an EEPROM, a CD or a DVD, read by a predetermined reading device (not shown), and stored in the storage unit 12. The autonomous travel program may be downloaded from a server (not shown) to the work vehicle 10 via the communication network N1 to be stored in the storage unit 12. In addition, the storage unit 12 may store the target route and the inter-field route that are generated at the operation terminal 20.

The traveling device 13 is a driving unit that causes the work vehicle 10 to travel. As illustrated in FIG. 2, the traveling device 13 includes an engine 131 (driving source), front wheels 132, rear wheels 133, a transmission 134, a front axle 135, a rear axle 136, a steering wheel 137, and the like. A pair of front wheels 132 and a pair of rear wheels 133 are provided on each side of the work vehicle 10. Furthermore, the traveling device 13 is not limited to be of the wheel type including the front wheels 132 and the rear wheels 133 but may also be of a crawler type including crawlers provided on each side of the work vehicle 10.

The engine 131 is a driving source such as a diesel engine and a gasoline engine that are driven using fuel supplied in a fuel tank (not shown). The traveling device 13 may include an electric motor as the driving source together with the engine 131 or in place of the engine 131. A generator (not shown) is connected to the engine 131, and electric power is supplied from the generator to electrical components such as the vehicle control device 11, a battery, and the like which are provided in the work vehicle 10. The battery is charged by the electric power supplied from the generator. Then, the electric components such as the vehicle control device 11 and the positioning device 16 provided on the work vehicle 10 can be driven by the electric power supplied from the battery even after the engine 131 is stopped.

Driving force of the engine 131 is transmitted to the front wheels 132 via the transmission 134 and the front axle 135, and is transmitted to the rear wheels 133 via the transmission 134 and the rear axle 136. The driving force of the engine 131 is also transmitted via a PTO shaft (not shown) to the work machine 14. When the work vehicle 10 performs autonomous travel, the traveling device 13 performs traveling operation according to an instruction from the vehicle control device 11.

Examples of the work machine 14 include a mower, a cultivator, a plow, a fertilizer, a seeding machine, a spraying machine, and the work machine 14 is detachable to/from the work vehicle 10. This allows the work vehicle 10 to perform various types of work by using different work machines 14. In the present embodiment, an example, in which the work machine 14 is the mower, is described.

For example, the work vehicle 10 is equipped with a directly-mounted-type work machine 14 (mower) and performs mowing operation while traveling in each of the field F1 and the field F2. The work machine 14 is not limited to the directly-mounted-type work machine that is secured to the work vehicle 10, and may be a towed-type work machine that is towed by the work vehicle 10.

When traveling on the road R0 (see FIG. 3), the work vehicle 10 may travel with the work machine 14 attached thereto or with the work machine 14 removed therefrom. For example, when the work vehicle 10 performs the mowing operation in each of the field F1 and the field F2, after the mowing operation in the field F1 is completed, the work vehicle 10 travels on the road R0 with the mower attached thereto, moves into the field F2, and performs the mowing operation in the field F2. When the work vehicle 10 has elevating function for the work machine 14, it can travel on the road R0 with the work machine 14 raised. For example, when performing different operations in each of the field F1 and the field F2, after the operation in the field F1 is completed, the work vehicle 10 travels on the road R0 with the work machine 14 removed therefrom, moves into the field F2, and performs operation in the field F2 with the work machine 14 attached thereto.

The steering wheel 137 is an operating unit operated by an operator or the vehicle control device 11. For example, with a hydraulic power steering mechanism (not shown) or the like, the traveling device 13 changes an angle of the front wheels 132 in response to the steering wheel 137's operation by the vehicle control device 11, thereby to change an advancing direction of the work vehicle 10. When the operator performs a teaching operation (details thereof will be described below), the operator operates the steering wheel 137 to manually drive the work vehicle 10.

In addition to the steering wheel 137, the traveling device 13 includes a shift lever, an accelerator, a brake, and the like (all not shown) which are operated by the vehicle control device 11. Then, in the traveling device 13, a gear of the transmission 134 is switched to a forward gear, a backward gear or the like in response to operation of the shift lever by the vehicle control device 11, and a traveling mode of the work vehicle 10 is switched to be forward, backward or the like. The vehicle control device 11 controls rotation speed of the engine 131 by operating the accelerator. Furthermore, the vehicle control device 11 operates the brakes to stop the rotation of the front wheels 132 and the rear wheels 133 using an electromagnetic brake.

The positioning device 16 is a communication device that includes a positioning control unit 161, a storage unit 162, a communication unit 163, a positioning antenna 164, and the like. For example, as shown in FIG. 2, the positioning device 16 is provided at an upper part of a cabin 138 in which an operator rides. Furthermore, an installation location of the positioning device 16 is not limited to the cabin 138. Furthermore, the positioning control unit 161, the storage unit 162, the communication unit 163, and the positioning antenna 164 of the positioning device 16 may be separately located at different positions in the work vehicle 10. Note that the battery is connected to the positioning device 16 as described above, and the positioning device 16 can operate even while the engine 131 is stopped. Moreover, a cell phone terminal, a smart phone, a tablet terminal or the like may be substituted for the positioning device 16.

The positioning control unit 161 is a computer system that includes one or more processors and storage memories, such as a nonvolatile memory, an RAM, or the like. The storage unit 162 is a non-volatile memory or the like that stores a program for causing the positioning control unit 161 to execute a positioning process, and data such as positioning information and movement information. For example, the control program is recorded in a computer-readable recording medium such as a flash ROM, an EEPROM, a CD or a DVD in a non-transitory manner, and is read by a predetermined reading device (not illustrated) to be stored in the storage unit 162. Note that the program may be downloaded from a server (not shown) to the positioning device 16 via the communication network N1 and stored in the storage unit 162.

The communication unit 163 is a communication interface that connects the positioning device 16 to the communication network N1 by wire or wirelessly, thereby to perform a data communication according to a predetermined communication protocol with external devices such as a base station (not shown) via the communication network N1.

The positioning antenna 164 is an antenna to receive a radio wave (a GNSS signal) transmitted from a satellite.

The positioning control unit 161 calculates a current position of the work vehicle 10 on the basis of the GNSS signals that the positioning antenna 164 receives from the satellite. For example, in the case where the work vehicle 10 travels autonomously in the field F1 and the field F2, or travels on the road R0 and the like upon the positioning antenna 164 receives radio waves (emission time, locus information, and the like) emitted from each of a plurality of satellites, the positioning control unit 161 calculates a distance between the positioning antenna 164 and each of the satellites and calculates a current position (a latitude and a longitude) of the work vehicle 10 on the basis of the calculated distance. Alternatively, the positioning control unit 161 may adopt a real-time kinematic positioning method (an RTK-GPS positioning method (an RTK method)) to calculate the current location of the work vehicle 10 by using correction information that corresponds to the base station (a reference station) near the work vehicle 10. Thus, the work vehicle 10 autonomously travels using the positioning information by the RTK method. Note that the current position of the work vehicle 10 may be the same as the positioning position (the position of the positioning antenna 164, for example) or it may be a position deviated from the positioning position.

The vehicle control device 11 includes control devices, such as a CPU, a ROM, a RAM, or the like. The CPU is a processor that executes various types of arithmetic processes. The ROM is a non-volatile storage unit that stores a control program, such as a BIOS, an OS, or the like, that causes the CPU to execute various types of arithmetic processes in advance. The RAM is a volatile or non-volatile storage unit that stores various pieces of information and is used as a temporary storage memory (work area) for the various types of processes executed by the CPU. Then, the vehicle control device 11 causes the CPU to execute various types of control programs, which is stored in the ROM or the storage unit 12 in advance, thereby controlling the work vehicle 10.

The vehicle control device 11 controls the movement of the work vehicle 10 in accordance with various user operations to the work vehicle 10. In addition, the vehicle control device 11 executes autonomous travel process of the work vehicle 10 on the basis of a current position of the work vehicle 10 calculated by the positioning device 16, the preset target route, and the preset inter-field route.

As shown in FIG. 1, the vehicle control device 11 includes various types of processing units, such as a travel processor 111, an announcement process unit 112, a drive process unit 113, and the like. The vehicle control device 11 functions as the various processing units by causing the CPU to execute the various processes according to the autonomous travel program. Furthermore, some or all of the process units may be constituted of an electronic circuit. The autonomous travel program may be a program for causing a plurality of processors to function as the processing units.

The travel processor 111 controls travel of the work vehicle 10. Specifically, the travel processor 111 causes the work vehicle 10 to start autonomous travel upon acquiring a work start command from the operation terminal 20. For example, when the operator presses down a work start button on an operation screen of the operation terminal 20, the operation terminal 20 outputs the work start instruction to the work vehicle 10. Upon obtaining the work start instruction from the operation terminal 20, the travel processor 111 causes the work vehicle 10 to start the autonomous travel. Thus, the work vehicle 10 starts the autonomous travel in accordance with the target route R1 (see FIG. 4A) in the field F1, for example and starts working by the work machine 14. The work vehicle 10 starts the autonomous travel in accordance with the target route R2 (see FIG. 4B) in the field F2, for example and starts working by the work machine 14. The work vehicle 10 also performs the autonomous travel along the inter-field route R12 (see FIG. 3) on the road R0, for example. That is, the travel processor 111 can cause the work vehicle 10 to autonomously travel along the inter-field route R12 on the road R0 outside the field. For example, the travel processor 111 causes the work vehicle 10 to autonomously travel on the road R0 that connects the field F1 and the field F2 along the inter-field route R12 set on the road R0. The target route and the inter-field route that the work vehicle 10 travels autonomously are generated at the operation terminal 20, for example. By obtaining the data of the target route and the inter-field route from the operation terminal 20, the work vehicle 10 can travel autonomously along the target route and the inter-field route.

Furthermore, the travel processor 111 causes the work vehicle 10 to stop the autonomous travel when acquiring a travel stop command from the operation terminal 20. For example, if the operator presses down the stop button on the operation screen of the operation terminal 20, the operation terminal 20 outputs a travel stop instruction to the work vehicle 10.

The travel processor 111 causes the work vehicle 10 to stop autonomous travel when the work vehicle 10 detects an obstacle. For example, in a case where an obstacle detection device (not illustrated) mounted on the work vehicle 10 detects the obstacle in a range of 3 m to 8 m forward the work vehicle 10, the travel processor 111 causes the work vehicle 10 to be decelerated. When the obstacle detection device detects the obstacle in the range up to 3 m forward the work vehicle 10, the travel processor 111 causes the work vehicle 10 to be stopped.

The announcement process unit 112 causes the work vehicle to announce in the field driving information associated with driving on the inter-field route. The travel processor 111 controls the autonomous travel of the work vehicle 10 in response to the operator's operation after an announcement process is executed. The announcement process by the announcement process unit 112 is specifically described below.

The drive process unit 113 controls drive (stopping, starting, etc.) of the drive source (e.g., engine 131) that drives the work machine 14. The drive process by the drive process unit 113 is specifically described below.

Operation Terminal 20

As illustrated in FIG. 1, the operation terminal 20 is an information processing device that includes an operation control unit 21, a storage unit 22, an operation display unit 23, and a communication unit 24. The operation terminal 20 may consist of a portable terminal, such as a tablet terminal or a smartphone.

The communication unit 24 is a communication interface that connects the operation terminal 20 to the communication network N1 by wire or wirelessly, thereby to perform a data communication according to a predetermined communication protocol with external devices such as one or more work vehicles 10 via the communication network N1.

The operation display unit 23 is a user interface including a display unit, such as a liquid crystal display or an organic EL display, that displays various pieces of information and an operating unit, such as a touch panel, a mouse, or a keyboard, that receives operations. On an operation screen displayed on the display unit, an operator can operate the operating unit to register various pieces of information (such as work vehicle information, field information, and work information, which will be described later).

The operator can also operate the operating unit to set the inter-field route R12 (teaching operation) for causing the work vehicle 10 to travel autonomously on the road R0 (connecting road) connecting the field F1 and the field F2.

Furthermore, the operator can also operate the operating unit to provide the work vehicle 10 with the travel starting command, the travel stopping command, and the like. Furthermore, in a place away from the work vehicle 10, the operator can grasp from a traveling trajectory displayed on the operation terminal 20 a traveling state in which the work vehicle 10 travels autonomously in the fields F1 and F2 and on the road R0 in accordance with the target route and the inter-field route.

The storage unit 22 is a non-volatile storage unit such as an HDD or an SSD that stores various pieces of information. The storage unit 22 stores a control program, such as an autonomous travel program that causes the operation control unit 21 to execute an autonomous travel process described later (see FIGS. 10, 11, 24, and 28). For example, the autonomous travel program is non-temporarily recorded in a computer-readable recording medium such as a flash ROM, an EEPROM, a CD or a DVD, read by a predetermined reading device (not shown), and stored in the storage unit 22. The autonomous travel program may be downloaded from a server (not illustrated) via the communication network N1 to the operation terminal 20 and stored in the storage unit 22.

Furthermore, a dedicated application for causing the work vehicle 10 to travel autonomously is installed in the storage unit 22. The operation control unit 21 activates the dedicated application and executes setting process of various pieces of information associated with the work vehicle 10, and generation process of the target route and the inter-field route for the work vehicle 10, and issues an autonomous travel instruction to the work vehicle 10.

The storage unit 22 also stores data such as work vehicle information associated with the work vehicle 10 and target route information associated with the target route. The work vehicle information includes information such as a vehicle number and a vehicle model for each work vehicle 10. The vehicle number is identification information of the work vehicle 10. The vehicle model is a vehicle model of the work vehicle 10. Note that the storage unit 22 may store either the work vehicle information associated with one work vehicle 10 or the work vehicle information associated with a plurality of work vehicles 10. For example, in a case where a particular operator owns a plurality of work vehicles 10, the storage unit 22 stores the work vehicle information associated with each of the work vehicles 10.

The target route information includes information such as a route name, a field name, an address, a field area size, and a work time for each target route. The route name is a route name of the target route generated at the operation terminal 20. The field name is a name of a field to be worked, for which the travel route is set. The address is an address of the field and the field area size is size of the field area. The work time is a time required to work the field by the work vehicle 10.

In a case where the target route is a route corresponding to the road R0 (inter-field route), the target route information includes information, such as a route name, an address, a travel distance, and a travel time. The route name is a name of the road R0 and the address is an address of the road R0. The travel distance is a distance in which the work vehicle 10 travels on the road R0, and it is a distance from the field F1 to the field F2, for example. The travel time is a time period during which the work vehicle 10 travels on the road R0, and it is a time period required for the work vehicle to move from the field F1 to the field F2, for example.

The storage unit 22 may store either the target route information associated with one target route R or the target route information associated with a plurality of target routes. For example, in a case where a particular operator generates a plurality of target routes for one or more fields owned by the operator, the target route information associated with each of target routes is stored in the storage unit 22. It is noted that either one target route or a plurality of target routes may be set for a single field. Furthermore, either one inter-field route or a plurality of inter-field routes may be set for a single field. In the present embodiment, the storage unit 22 stores the target route information corresponding to the target route R1 for traveling in the field F1 (see FIG. 4A), the target route information corresponding to the target route R2 for traveling in the field F2 (see FIG. 4B), and the target route information corresponding to the inter-field route R12 for traveling on the road R0 (see FIG. 3).

As another embodiment, some or all of the information such as the work vehicle information and the target route information may be stored in a server accessible from the operation terminal 20. The operator may perform an operation for registering the work vehicle information and the target route information in the server (e.g., a personal computer, a cloud server, and the like). In this case, the operation control unit 21 may acquire the information from the server and execute each process such as the autonomous travel process described later (see FIGS. 10, 11, 24, and 28).

The operation control unit 21 has control devices such as a CPU, a ROM, and a RAM. The CPU is a processor that executes various types of arithmetic processes. The ROM is a non-volatile storage unit that stores in advance a control program, such as a BIOS and an OS, that causes the CPU to execute various types of arithmetic processes. The RAM is a volatile or non-volatile storage unit that stores various pieces of information and is used as a temporary storage memory for the various processes executed by the CPU. The operation control unit 21 controls the operation terminal 20 by causing the CPU to execute various types of control programs stored in advance in the ROM or the storage unit 22.

As illustrated in FIG. 1, the operation control unit 21 includes various process units such as a setting process unit 211, a reception process unit 212, an acquisition process unit 213, a generation process unit 214, and an output process unit 215. The operation control unit 21 functions as the various processing units by causing the CPU to execute the various types of processes according to the control programs. Furthermore, some or all of the process units may be constituted of an electronic circuit. Note that the control program may be the program that causes a plurality of processors to function as the process units.

Figure 5A:
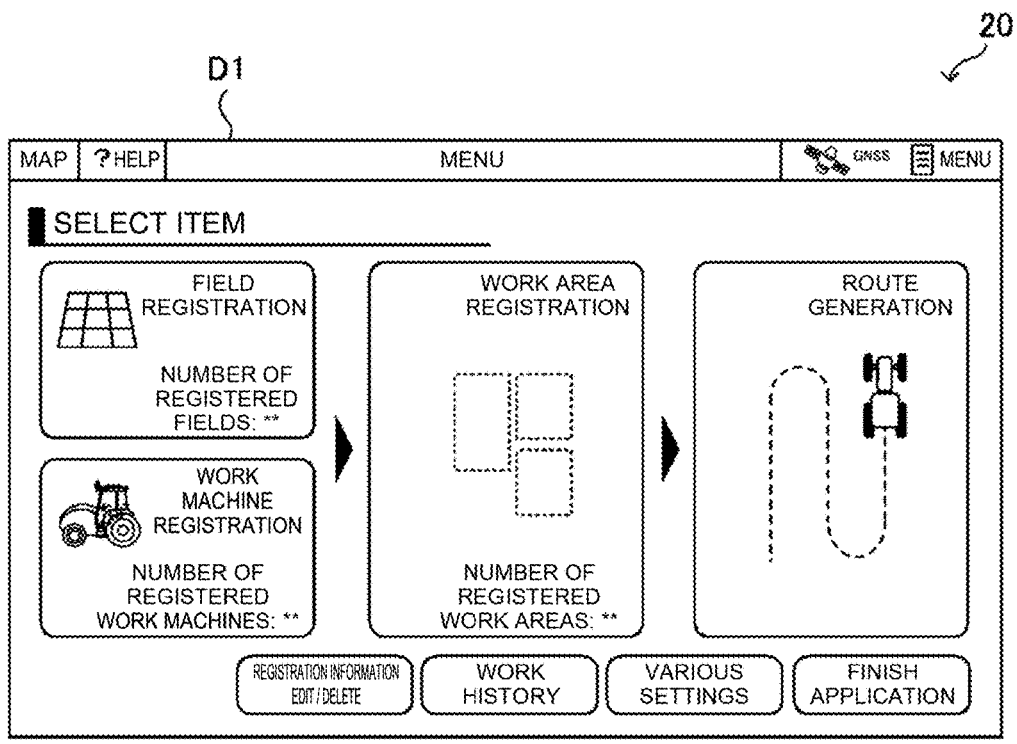
FIG. 5A is a diagram illustrating an example of an operation screen displayed on an operation terminal according to the embodiment of the present disclosure.

The setting process unit 211 sets information associated with the work vehicle 10 (hereinafter, referred to as work vehicle information), information associated with the field (hereinafter, referred to as field information), and information associated with the specific way how to perform work (hereinafter, referred to as work information). The setting process unit 211 accepts setting operations by the operator on the setting screen D1 illustrated in FIG. 5A to register each setting information, for example.

Specifically, by allowing the operator to perform the registration operation on the operation terminal 20, the vehicle setting process unit 211 sets information associated with the model of the work vehicle 10, the position where the positioning antenna 164 is mounted on the work vehicle 10, the type of the work machine 14, the size and the shape of the work machine 14, the position of the work machine 14 with respect to the work vehicle 10, the vehicle speed and the engine rotation speed of the work vehicle 10 during work, the vehicle speed and the engine rotation speed of the work vehicle 10 during turning, etc.

In addition, by allowing the operator to perform registration operation on the operation terminal 20, the setting process unit 211 sets information associated with the position and the shape of the field, the work start position to start work (travel start position), the work end position to finish work (travel end position), and the work direction, etc.

For example, one operator who rides on the work vehicle 10 drives so as to circle once around an outer periphery of the field, and records a transition of position information of the positioning antenna 164 at that time, so that the information associated with the position and the shape of the field can be obtained autonomously. Furthermore, the position and the shape of the field can be acquired on the basis of a polygon shape obtained by allowing the operator to operate the operation terminal 20 with a map displayed on the operation terminal 20 and designate a plurality of points on the map. A region specified by the obtained position and the shape of the field is a region (travel region) where the work vehicle 10 can travel.

Figure 4B:
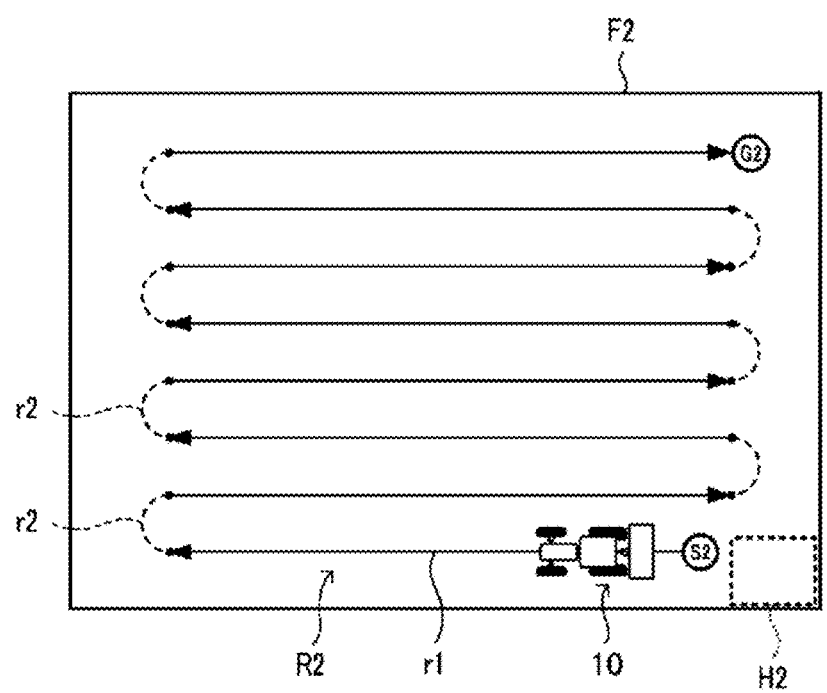
FIG. 4B is a diagram illustrating another example of a target route of the work vehicle according to the embodiment of the present disclosure.

For example, the setting process unit 211 registers the field information for the field F1 shown in FIG. 4A and the field information for the field F2 shown in FIG. 4B.

The setting process unit 211 is configured to set, as the work information, presence or absence of cooperative work between the work vehicle 10 (unmanned tractor) and the manned work vehicle 10, the skip number, which is the number of work routes skipped when the work vehicle 10 turns in the headland, the width of the headland, the width of the non-cultivated land, and the like.

On the basis of the each setting information, the setting process unit 211 also generates the target route for causing the work vehicle 10 to travel autonomously in the field. Specifically, the setting process unit 211 generates the target route based on the work start position and the work end position registered in the field setting. For example, as shown in FIG. 4A, the setting process unit 211 generates based on the operator's setting operation a target route R1 including the travel start position S1, travel end position G1, straight advancing route r1 (solid line in FIG. 4A), and turning route r2 (dotted line in FIG. 4A). For example, as shown in FIG. 4B, the setting process unit 211 generates based on the operator's setting operation a target route R2 including the travel start position S2, travel end position G2, straight advancing route r1 (solid line in FIG. 4B), and turning route r2 (dotted line in FIG. 4B). The setting process unit 211 registers the generated target route R1 in association with the field F1 and registers the generated target route R2 in association with the field F2.

Here, the operation control unit 21 generates the inter-field route of the road R0 connecting between multiple fields based on operations (teaching operations) by the operator, as described below.

Specifically, the reception process unit 212 accepts the operator's travel operation. For example, the reception process unit 212 accepts the travel operation to cause the work vehicle 10 to travel manually from the field F1 to the field F2 (manual steering). The acquisition process unit 213 acquires from the positioning device 16 the position information of the work vehicle 10 which are traveling on the road R0 that connects the field F1 and the field F2 based on the travel operation by the operator. The generation process unit 214 generates the inter-field route R12 for causing the work vehicle 10 to travel autonomously between the field F1 and the field F2 based on the position information of the work vehicle 10, which is obtained based on the travel operation by the operator.

Figure 5B:
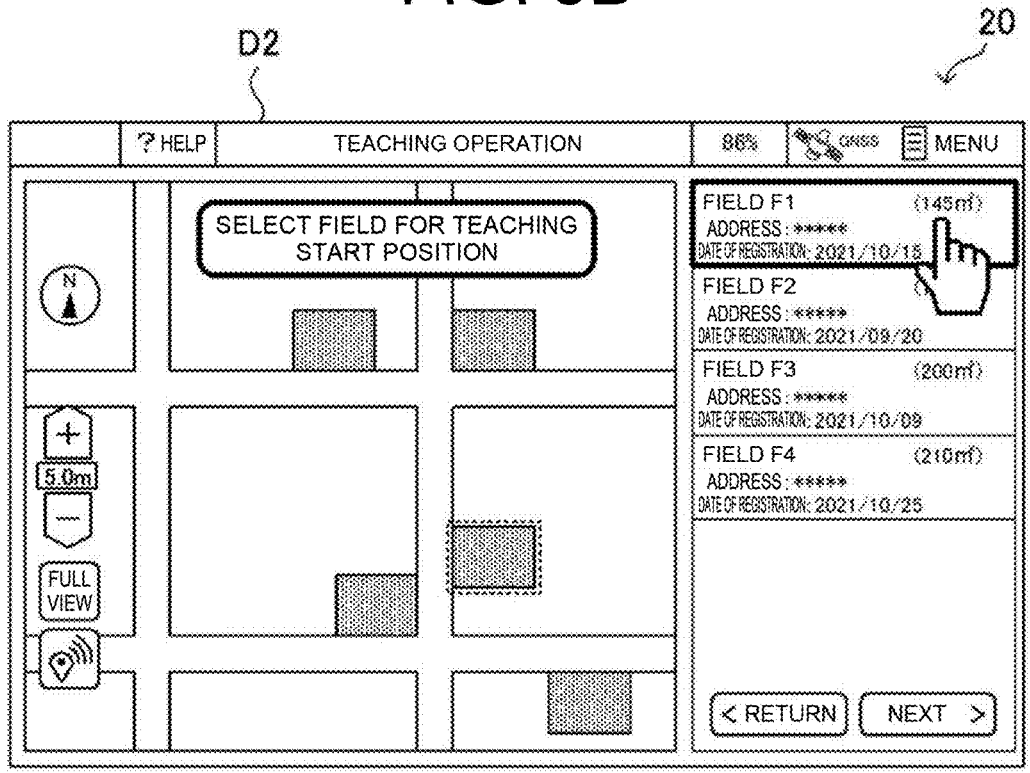
FIG. 5B is a diagram illustrating an example of a teaching operation screen displayed on the operation terminal according to the embodiment of the present disclosure.

For example, the reception process unit 212 causes the teaching operation screen D2 shown in FIG. 5B to display and accept selecting operations of the fields from the operator. The teaching operation screen D2 displays a list of the field information of a plurality of fields registered by the setting process unit 211. The operator selects the plurality of fields to be targets of the inter-field route on the teaching operation screen D2.

First, the operator selects a field (here, the field F1) where the teaching operation is started (see FIG. 5B). Upon the operator selects the field F1, the reception process unit 212 causes the teaching operation screen D2 to display the selected field F1 identifiably on the map (dotted line frame image) (see FIG. 5B).

Figure 5C:
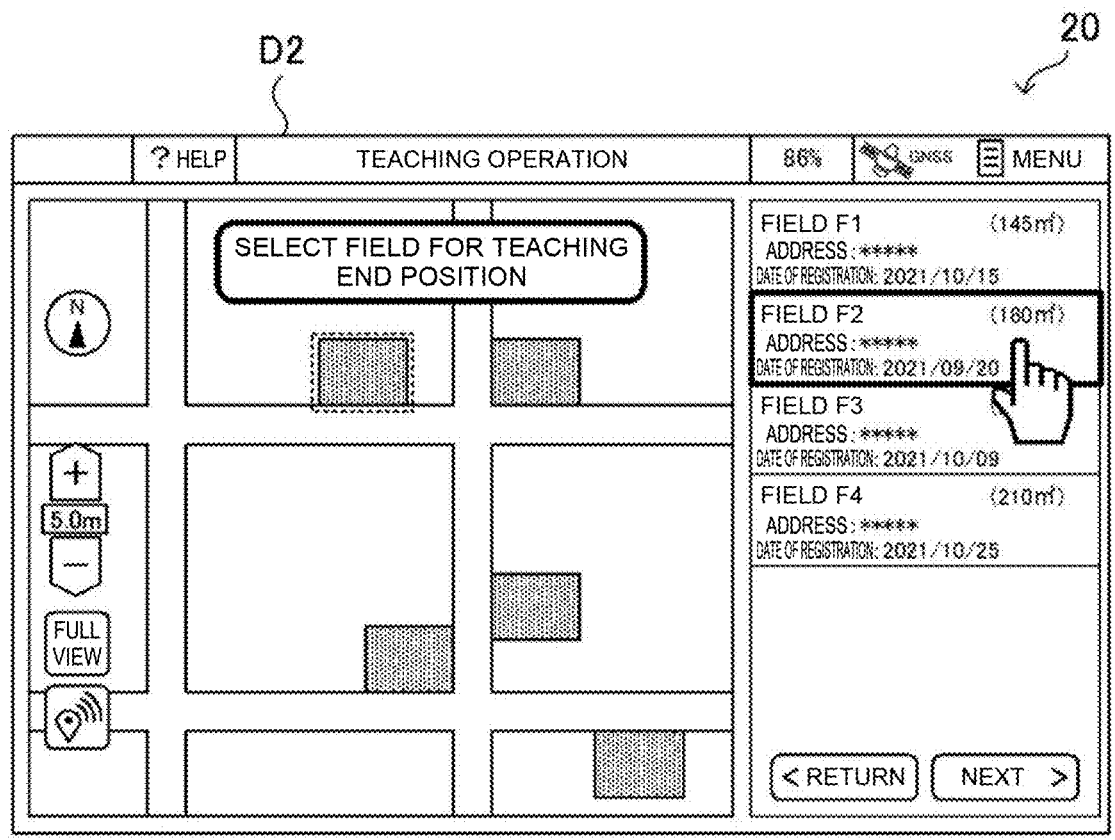
FIG. 5C is a diagram illustrating another example of the teaching operation screen displayed on the operation terminal according to the embodiment of the present disclosure.

Next, the operator selects the field where the teaching operation is ended (here, the field F2) (see FIG. 5C). Upon the operator selects the field F2, the reception process unit 212 causes the teaching operation screen D2 to display the selected field F2 identifiably on the map (dotted line frame image) (see FIG. 5C).

Upon the reception process unit 212 accepts the selecting operation of the plurality of fields where the inter-field route is to be set from the operator, it accepts starting operation of the teaching travel. For example, on the teaching operation screen D2 illustrated in FIG. 6A, when the operator presses down a start button, the reception process unit 212 accepts the starting operation of the teaching travel. Upon the reception process unit 212 accepts the starting operation, it sets a route start position Ts1 in the field F1. For example, the reception process unit 212 sets the current position of the work vehicle 10 at the time when the starting operation is accepted as the route start position Ts1.

As another embodiment, the reception process unit 212 may set the route start position Ts1 in the field F1 in the case where the starting operation is received from the operator in a state where the work vehicle 10 is located in a predetermined area in the field F1. For example, provided that the work vehicle 10 is located in an area of an entrance/exit H1 in the field F1 (see FIG. 4A), the reception process unit 212 accepts the starting operation from the operator and sets the route start position Ts1 in the field F1. In contrast, in a case where the work vehicle 10 is located outside the area of the entrance/exit H1 in the field F1, the reception process unit 212 does not set the route start position Ts1 in the field F1 even when the reception process unit 212 accepts the starting operation from the operator. In this case, the reception process unit 212 may notify a message indicating that the route start position Ts1 cannot be set, a message urging the work vehicle 10 to move inside the area of the entrance/exit H1, and the like. According to this configuration, the start position of the inter-field route for moving between the fields can be set in a specific area (e.g., entrance/exit H1), thereby limiting the position to go outside the field from inside the field.

Figure 6A:
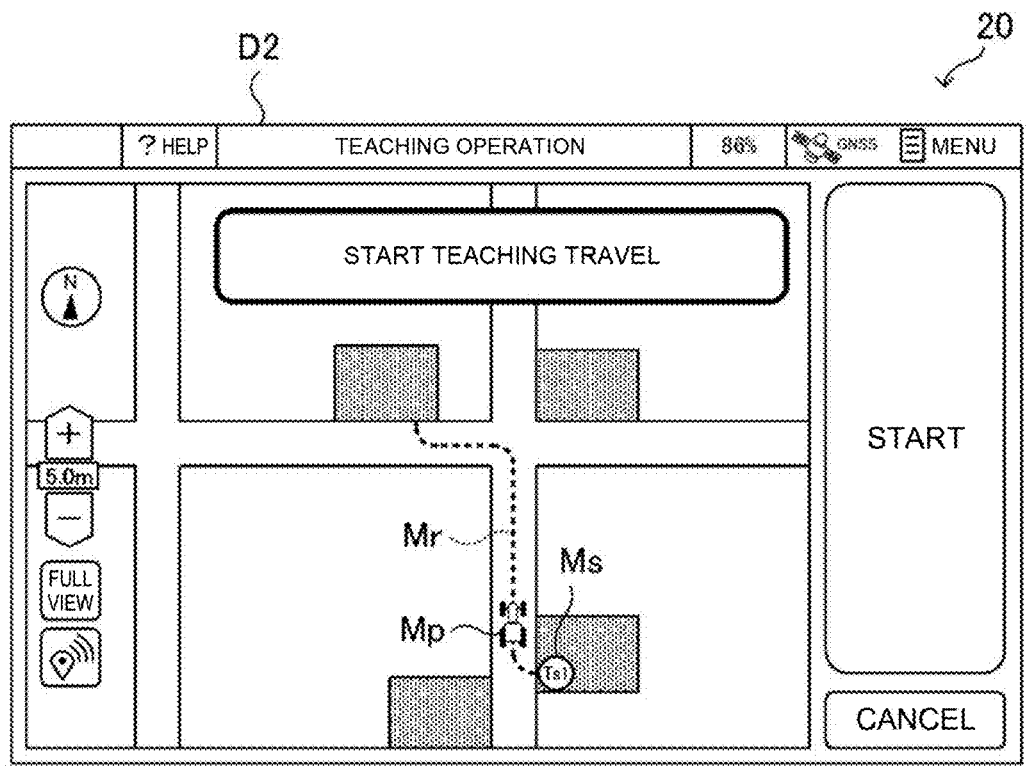
FIG. 6A is a diagram illustrating an example of the teaching operation screen displayed on the operation terminal according to the embodiment of the present disclosure.

Upon the reception process unit 212 accepts the starting operation from the operator, it causes the teaching operation screen D2 to display on the map a route start position image Ms which indicates that the route start position Ts1 is the entrance/exit H1 of the field F1 (see FIG. 6A). As illustrated in FIG. 6A, the reception process unit 212 causes teaching operation screen D2 to display a guide route Mr (dotted line) that connects the field F1 and the field F2 as information to support the travel operation of the teaching travel. This allows the operator to perform the manual travel operation (manually drive) according to the guide route Mr, thereby making it easier to perform the teaching travel operation.

For example, the operator brings in the operation terminal 20 to the work vehicle 10 and manually drives the work vehicle 10 on the road R0 from the field F1 to the field F2 (see FIG. 3) while checking the guide route Mr displayed on the operation terminal 20. The reception process unit 212 accepts the travel operation (manual steering) by the operator. The reception process unit 212 causes the teaching operation screen D2 to display a current position image Mp at a position on the guide route Mr corresponding to the current position of the work vehicle 10.

The acquisition process unit 213 acquires the position information of the work vehicle 10 while the operator performs the teaching travel of the work vehicle 10 on the road R0. The acquisition process unit 213 also acquires travel speed information of the work vehicle 10 during the teaching travel. The acquisition process unit 213 may acquire information about the road R0 during the teaching travel (e.g., an obstacle, a road surface condition, a road width, a temporary stop line, a speed limit, a traffic signal, etc.).

Figure 6B:
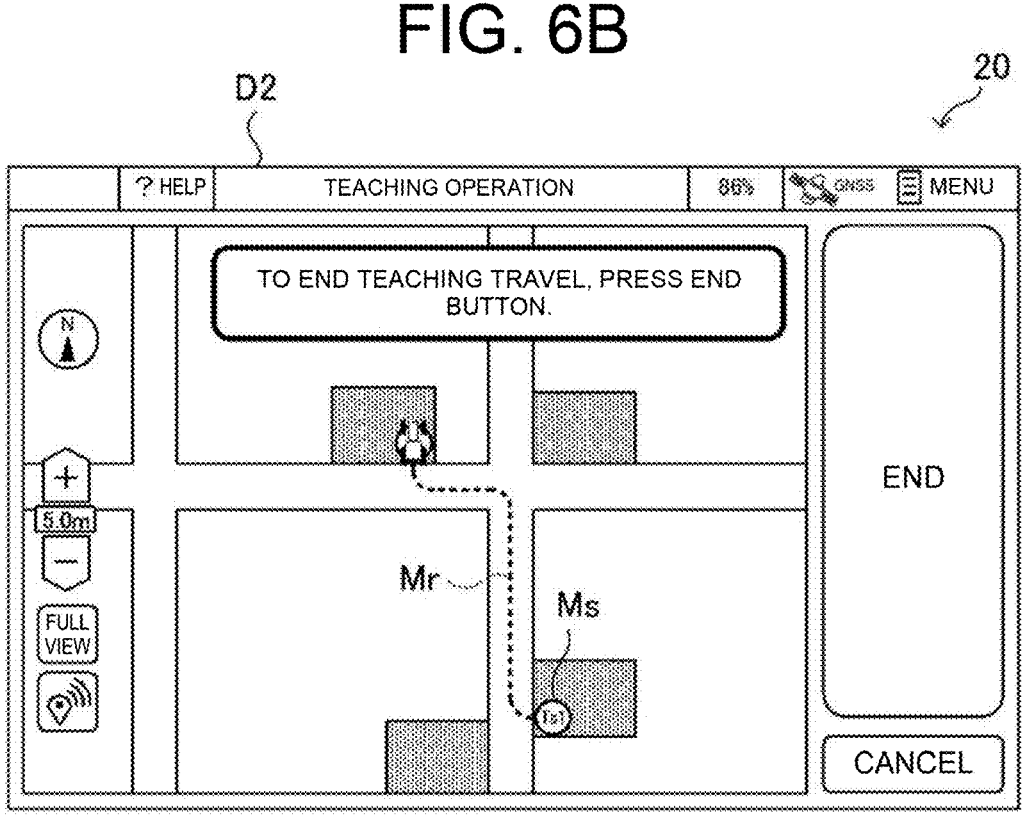
FIG. 6B is a view illustrating an example of the teaching operation screen displayed on the operation terminal according to an embodiment of the present disclosure.

When the operator drives the work vehicle 10 to the field F2 until the work vehicle 10 arrives at the field F2, the operator presses down the end button on the teaching operation screen D2 (see FIG. 6B). When the operator presses down the end button, the reception process unit 212 accepts ending operation of the teaching travel. When the reception process unit 212 accepts the ending operation, the reception process unit 212 sets a route end position Te2 in the field F2. For example, the reception process unit 212 sets the current position of the work vehicle 10 at the time when the ending operation is accepted as the route end position Te2.

As another embodiment, the reception process unit 212 may set the route end position Te2 in the field F2 when accepting the ending operation from the operator with the work vehicle 10 located in a predetermined area in the field F2. For example, provided that the work vehicle 10 is located within an area of the entrance/exit H2 in the field F2 (see FIG. 4B), the reception process unit 212 accepts the ending operation from the operator and sets the route end position Te2 in the field F2. In contrast, in a case where the work vehicle 10 is located outside the area of the entrance/exit H2 in the field F2, the reception process unit 212 does not set the route end position Te2 in the field F2 even when the reception process unit 212 accepts the ending operation from the operator. In this case, the reception process unit 212 may notify a message indicating that the route end position Te2 cannot be set, a message urging the work vehicle 10 to move inside the area of the entrance/exit H2, and the like. According to this configuration, the start position of the inter-field route for moving between the fields can be set in a specific area (e.g., entrance/exit H2), thereby limiting the position to go outside the field from inside the field.

Figure 6C:
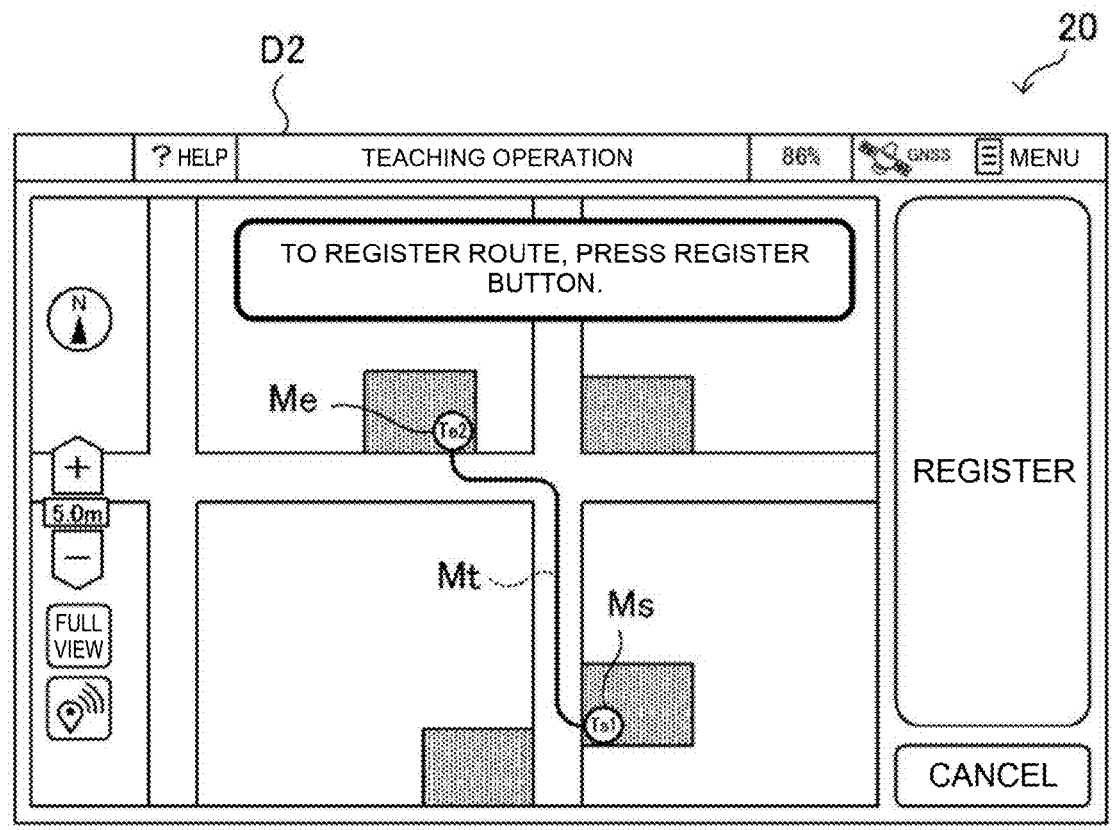
FIG. 6C is a diagram illustrating an example of the teaching operation screen displayed on the operation terminal according to the embodiment of the present disclosure.

Upon the reception process unit 212 accepts the ending operation from the operator, it causes the teaching operation screen D2 to display on the map a route end position image Me which indicates that the route end position Te2 is the entrance/exit H2 of the field F2 (see FIG. 6C).

Figure 7:
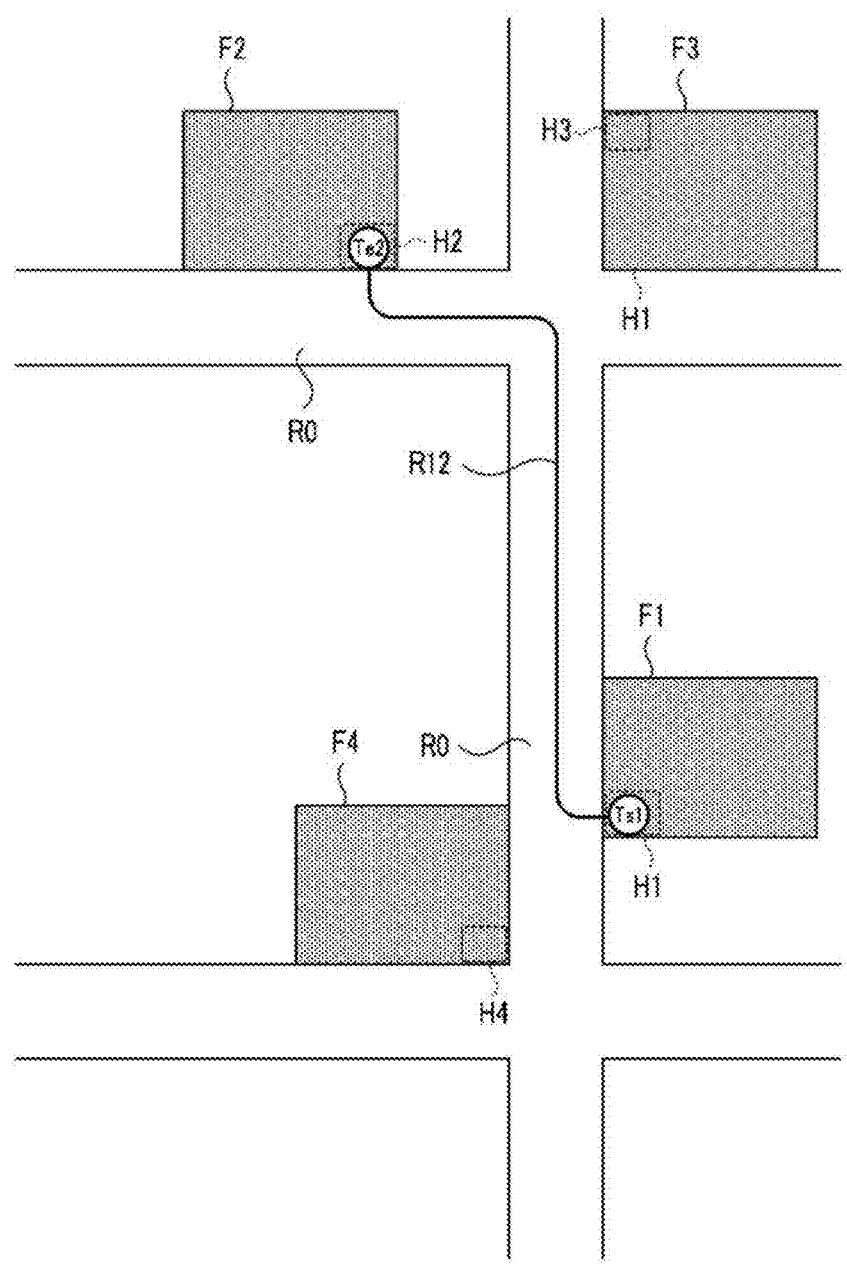
FIG. 7 is a diagram illustrating an example of an inter-field route of the work vehicle according to the embodiment of the present disclosure.

Upon the reception process unit 212 accepts the ending operation from the operator, the generation process unit 214 generates the inter-field route R12 for causing the work vehicle 10 to autonomously travel between the fields F1 and F2 based on the position information of the work vehicle 10, which is acquired by the acquisition process unit 213. Specifically, the generation process unit 214 generates the inter-field route R12 that connects the route start position Ts1 at the entrance/exit H1 of the field F1 and the route end position Te2 at the entrance/exit H2 of the field F2 and passes through the road R0, as illustrated in FIG. 7. The generation process unit 214 causes the teaching operation screen D2 shown in FIG. 6C to display a route image Mt (solid line) of the generated inter-field route R12 on the map.

The generation process unit 214 notifies the operator of whether or not to register the generated inter-field route R12 on the teaching operation screen D2 illustrated in FIG. 6C. When the operator confirms the inter-field route R12 on the teaching operation screen D2 and presses down the registration button, the generation process unit 214 acquires the command to register the inter-field route R12. When the generation process unit 214 acquires the registration command, it registers the inter-field route R12 in association with the field F1 and the field F2.

Figures 8, 9:
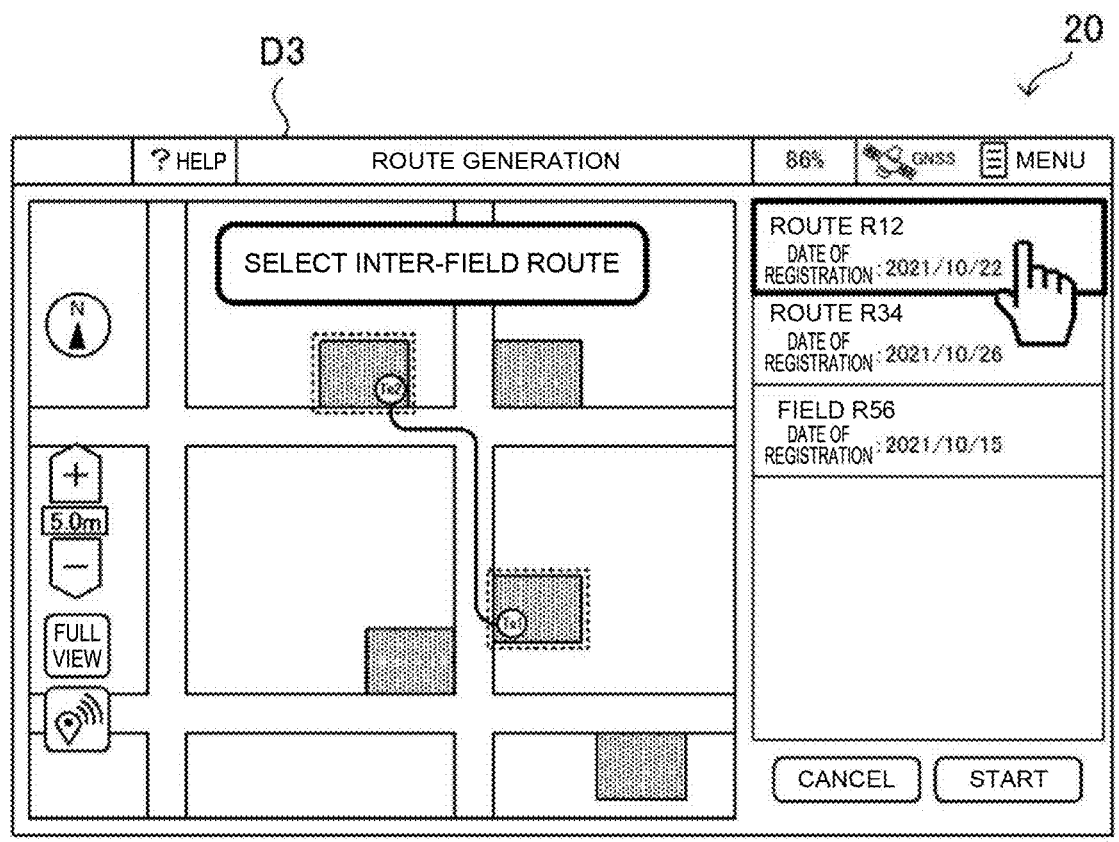
FIG. 8 is a diagram illustrating an example of an inter-field route information table according to the embodiment of the present disclosure.
FIG. 9 is a diagram illustrating an example of the operation screen displayed on the operation terminal according to the embodiment of the present disclosure.

Specifically, the generation process unit 214 registers the inter-field route R12 in an inter-field route information table E1. FIG. 8 shows an example of the inter-field route information table E1. The inter-field route information table E1 includes a route ID, a start field, an end field, position information, speed information, or the like. The route ID is identification information of the inter-field route. A route ID "R001" may indicate the inter-field route R12. The start field is information indicating the field corresponding to the route start position of the inter-field route, and the end field is information indicating the field corresponding to the route end position of the inter-field route. The position information is information indicating a position of the inter-field route, and information of a coordinate position acquired at a predetermined cycle (sampling intervals). The speed information is the traveling speed of the work vehicle 10 when the work vehicle performs the teaching travel on the inter-field route, and is information about the traveling speed for each coordinate position. For every time when the operator selects multiple fields to perform the teaching operation, the generation process unit 214 registers the generated inter-field routes in association with the fields in the inter-field route information table E1.

When the operator causes the work vehicle 10 to initiate the autonomous travel, he/she selects multiple fields and also selects the inter-field route for traveling autonomously between fields out of the inter-field routes registered in the inter-field route information table E1. For example, in the route generation screen D3 shown in FIG. 9, if the operator selects the fields F1 and F2, the operation control unit 21 causes the screen to display a list of the inter-field routes registered in the inter-field route information table E1 and accepts the selection operation of inter-field route by the operator. Although omitted in the drawings, the operation control unit 21 accepts on the route generation screen D3 the selection operation of the target route R1 for the field F1 (see FIG. 4A) and the target route R2 for the field F2 (see FIG. 4B).

The operation control unit 21 determines whether the inter-field route connecting the field F1 and the field F2 is registered in the inter-field route information table E1, and causes the operation screen D3 to display the inter-field route when the inter-field route is registered in the inter-field route information table E1.

When the operator performs the selection operation to select the field F1 and the field F2, the selection operation to select the target route R1 for the field F1 and the target route R2 for the field F2, and the selection operation to select the inter-field route R12 on which the work vehicle 10 moves between the field F1 and the field F2, and then presses down the start button (see FIG. 9), the output process unit 215 outputs route data of the target routes and the inter-field route to the work vehicle 10. Note that when the operator selects the field F1 and the field F2, the operation control unit 21 may extract the inter-field route R12 that connects the field F1 and the field F2 from the inter-field routes registered in the inter-field route information table E1 and set the inter-field route R12. In this case, the selection operation of the inter-field route by the operator can be omitted.

Here, the output process unit 215 outputs to the work vehicle 10 the route data including the target route R1 which is a work route in the field F1 (see FIG. 4A), the target route R2 which is a work route in the field F2 (see FIG. 4B), and the inter-field route R12 which is an inter-field route that connects the field F1 and the field F2 (see FIG. 7).

Upon the route data of the target route generated from the operation terminal 20 is transmitted to the work vehicle 10, the work vehicle 10 stores the route data in the storage unit 12. The work vehicle 10 performs an autonomous travel process based on the route data while detecting the current position of the work vehicle 10 with the positioning antenna 164. The current position of the work vehicle 10 usually coincides with the position of the positioning antenna 164.

The work vehicle 10 is configured to be able to autonomously travel in the field F1 in a case where the current position of the work vehicle 10 coincides with the travel start position S1 in the field F1 (see FIG. 4A), and to autonomously travel in the field F2 in a case where the current position of the work vehicle 10 does not coincided with the travel start position S2 in the field F2 (see FIG. 4B). The work vehicle 10 is configured to be able to autonomously travel on the inter-field route R12 when the current position of the work vehicle 10 coincides with the route start position Ts1 at the entrance/exit H1 of the field F1 (see FIG. 7).

For example, in the case where the current position of the work vehicle 10 coincides with the travel start position S1 in the field F1, and when the operator presses down the start button (not shown) to issue a travel start command, the travel processor 111 of the work vehicle 10 causes the work vehicle 10 to initiate autonomous travel on the target route R1.

The travel processor 111 causes the work vehicle 10 to travel autonomously from the travel start position S1 to the travel end position G1 in the field F1 along the target route (see FIG. 4A). When the work vehicle 10 reaches the travel end position G1, the operator moves the work vehicle 10 from the travel end position G1 to the route start position Ts1. As indicated in an embodiment described below (see FIG. 12A), the operation control unit 21 may generate a route (interpolation route r31) for causing the work vehicle 10 to autonomously travel from the travel end position G1 to the route start position Ts1. In this case, when the work vehicle 10 reaches the travel end position G1, the work vehicle 10 autonomously travels from the travel end position G1 to the route start position Ts1 along the interpolation route r31.

If the current position of the work vehicle 10 coincided with the route start position Ts1, the travel processor 111 causes the work vehicle 10 autonomously travel from the route start position Ts1 to the route end position Te2 in the field F2 along the inter-field route R12 (see FIG. 7). The vehicle control device 11 causes the work vehicle 10 to be temporarily stopped when the work vehicle 10 goes out of the field F1 onto the road R0, and requires the operator for safety check (announcement process described later).

The travel processor 111 causes the work vehicle 10 to autonomously travel based on the position information, the speed information, and the like, which are associated with the inter-field route R12 (see FIG. 8). For example, the travel processor 111 sets the traveling speed corresponding to the speed information (e.g., travel speed during teaching travel) as an upper limit speed and causes the work vehicle 10 to autonomously travel while controlling the travel speed thereof. When the work vehicle 10 detects the obstacle during traveling autonomously on the road R0, the travel processor 111 causes the work vehicle 10 to autonomously travel along the inter-field route R12 while avoiding the obstacle.

The travel processor 111 causes the work vehicle 10 to be temporarily stopped when the work vehicle 10 enters into the field F2 from the road R0. When the work vehicle 10 reaches the route end position Te2, the operator moves the work vehicle 10 from the route end position Te2 to the travel start position S2 of the field F2. As indicated in an embodiment described below (see FIG. 12B), the operation control unit 21 may generate a route (interpolation route r32) for causing the work vehicle 10 to autonomously travel from the route end position Te2 to the travel start position S2. In this case, when the work vehicle 10 reaches the route end position Te2, the work vehicle 10 autonomously travels from the route end position Te2 to the travel start position S2 along the interpolation route r32.

When the current position of the work vehicle 10 coincides with the travel start position S2, the travel processor 111 causes the work vehicle 10 to travel autonomously from the travel start position S2 to the travel end position G2 along the target route R2 (see FIG. 4B). When the work vehicle 10 reaches the travel end position G2, the travel processor 111 causes the work vehicle 10 to terminate autonomous travel. Thus, the travel processor 111 causes the work vehicle 10 to autonomously travel within the field F1, then autonomously travel along the inter-field route R12 from the field F1 to the field F2, and then autonomously travel within the field F2.

While the work vehicle 10 is traveling autonomously, the operator can grasp on the operation terminal 20 the traveling state in the field F1, the traveling state on the road R0 connecting the field F1 and the field F2, and the traveling state in the field F2, of the work vehicle 10.

Note that the operation terminal 20 may be accessible to a web site of agricultural support services (agricultural support site) provided by a server (not illustrated) via the communication network N1. In this case, a browser program is executed by the operation control unit 21, so that the operation terminal 20 can function as an operation terminal for the server. The server includes the above-mentioned each process units, which perform each process.

Autonomous Travel Process

An example of the autonomous travel process performed by the autonomous travel system 1 is described below with reference to FIGS. 10 and 11.

The present disclosure can be understood as a disclosure of an autonomous travel method that executes one or more steps included in the aforementioned autonomous travel process. One or more steps included in the autonomous travel process described herein may be omitted as appropriate. Note that each step in the above mentioned autonomous travel process may be executed in a different order as long as the same functional effect is obtained. Furthermore, although a case where the operation control unit 21 executes each step in the autonomous travel process is described as an example, an autonomous travel method in which one or more processors execute each of steps in the autonomous travel process in a distributed manner is also considered as another embodiment.

Furthermore, the autonomous travel method includes the route generation method of the present disclosure. For example, the teaching process illustrated in FIG. 11 is an example of the route generation process, and the teaching method of performing each of steps in the teaching process is an example of the route generation method of the present disclosure.

In step S1, the operation control unit 21 of the operation terminal 20 determines whether or not the selection operation of the field by the operator is accepted. If the operation control unit 21 accepts the selection operation of the field (S1: Yes), it moves the process to step S2. The operation control unit 21 waits until the selection operation of the field is accepted (S1: No). Here, the operator selects the field F1.

In step S2, the operation control unit 21 determines whether the selection operation of a work route by the operator is accepted. If the operation control unit 21 accepts the selection operation of the work route (S2: Yes), it moves the process to step S3. When the operation control unit 21 does not accept the selection operation of the work route (S2: No), the process returns to step S1. Here, the operator selects the target route R1 (see FIG. 4A) as a work route for the field F1.

In step S3, the operation control unit 21 determines whether the selection operation of the field is completed. For example, if the operator selects the field F1 and target route R1 and performs a completion operation (S3: Yes), the operation control unit 21 moves the process to step S4. If the selection operation of the field is not completed (S3: No), the operation control unit 21 moves the process to step S1.

Returning to step S1, the operation control unit 21 determines whether the selection operation of the field by the operator is accepted. Here, the operation control unit 21 accepts the selection operation of the field F2 from the operator. In subsequent step S2, the operation control unit 21 accepts from the operator the selection operation of the target route R2 (see FIG. 4B) as the work route corresponding to the field F2.

In step S4, the operation control unit 21 determines whether a plurality of fields are selected by the operator. If the operator selects the plurality of fields (S4: Yes), the operation control unit 21 moves the process to step S5. On the other hand, if the operator selects a single field (S4: No), the operation control unit 21 moves the process to step S7.

In step S5, the operation control unit 21 determines whether or not the inter-field route that connects the plurality of fields selected by the operator is already registered in the inter-field route information table E1 (see FIG. 8). If the inter-field route is being registered (S5: Yes), the operation control unit 21 moves the process to step S6. On the other hand, if the inter-field route is not registered (S5: No), the operation control unit 21 moves the process to step S51 (teaching process described later). Moving to step S51, the operation control unit 21 executes generation process of the inter-field route (S51) and sets the generated inter-field route as the inter-field route that connects the plurality of fields that are selected by the operator (S52). Here, the operation control unit 21 sets the inter-field route R12 generated by the teaching processing as the inter-field route that connects the field F1 and the field F2 (S52). After the step S52, the operation control unit 21 moves the process to the step S7.

In step S6, the operation control unit 21 sets the inter-field route that is selected by the operator or the inter-field route that is automatically extracted, out of the inter-field routes registered in the inter-field route information table E1 (see FIG. 8), as the inter-field route that connects the plurality of fields selected by the operator. Thereafter, the operation control unit 21 moves the process to step S7.

In step S7, the operation control unit 21 determines whether travel start operation command issued by the operator is accepted. If the operation control unit 21 accepts the travel start operation command issued by the operator (S7: Yes), the operation control unit 21 moves the process to step S8. The operation control unit 21 waits until the travel start operation command issued by the operator is accepted (S7: No).

In step S8, the operation control unit 21 outputs the route data to the work vehicle 10. Here, the operation control unit 21 outputs to the work vehicle 10 the route data including the target route R1 which is a work route in the field F1 (see FIG. 4A), the target route R2 which is a work route in the field F2 (see FIG. 4B), and the inter-field route R12 which is an inter-field route that connects the field F1 and the field F2 (see FIG. 7).

Upon acquiring the route data, the work vehicle 10 starts autonomous travel in accordance with operation by the operator. This allows the work vehicle 10 to autonomously travel on the road R0 from the route start position Ts1 in the field F1 to the route end position Te2 in the field F2 (see FIG. 7) when the work vehicle 10 autonomously travels along the target route R1 from the travel start position S1 to the travel end position G1 in the field F1 (see FIG. 4A) and finishes the work in the field F1. When the work vehicle 10 reaches the route end position Te2, the work vehicle 10 autonomously travels from the travel start position S2 to the travel end position G2 in the field F2 (see FIG. 4B) to finish the work in the field F2.

In step S9, the operation control unit 21 determines whether or not the work vehicle 10 reaches the travel end position. Here, the travel end position becomes the travel end position G2 of the field F2 (see FIG. 4B). Upon the work vehicle 10 reaches the travel end position (S9: Yes), the operation control unit 21 finishes the process. The operation control unit 21 waits until the work vehicle 10 reaches the travel end position (S9: No).

Teaching Process

Figure 10:
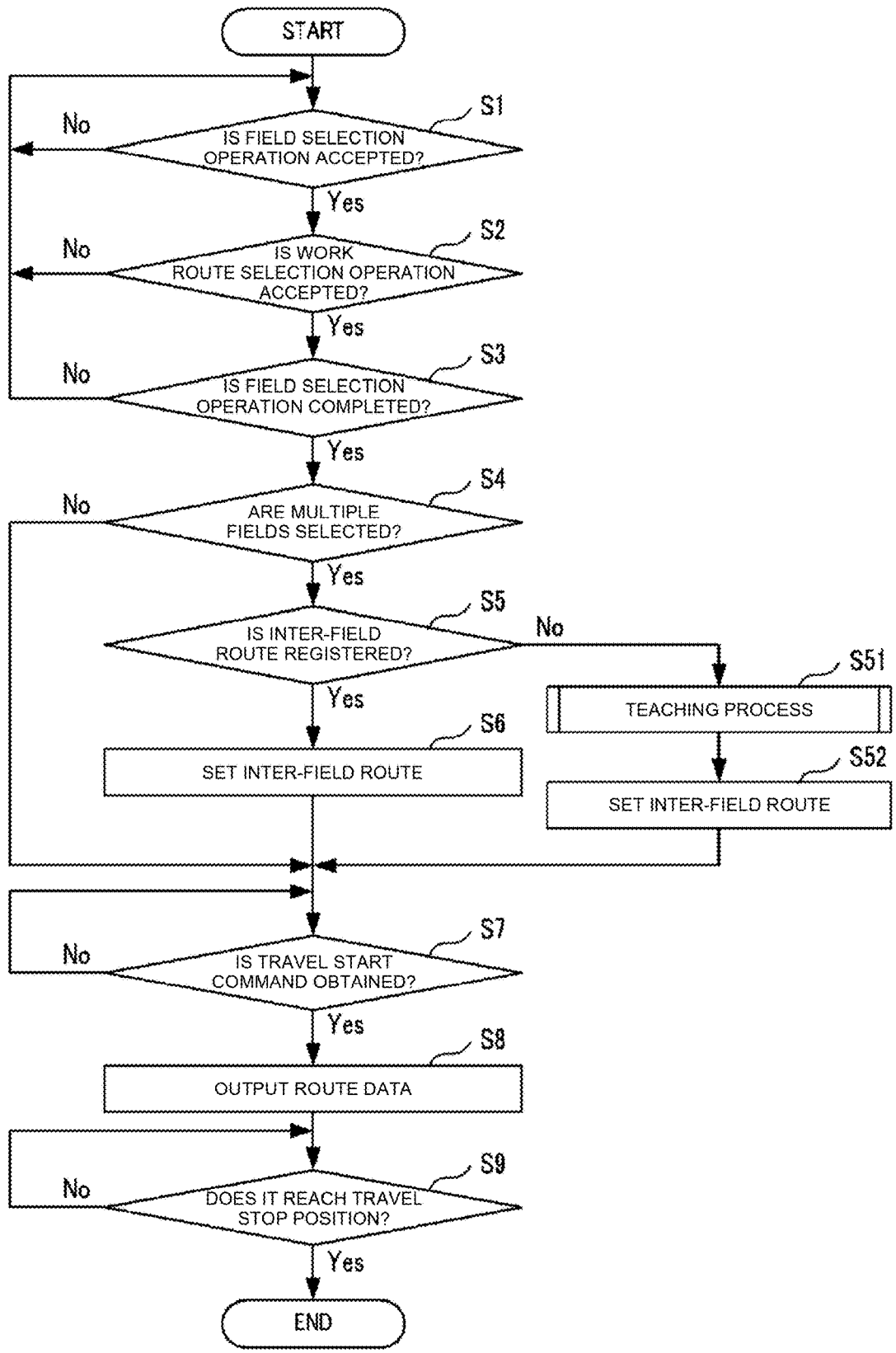
FIG. 10 is a flowchart illustrating an example of a procedure of an autonomous travel process executed by the autonomous travel system according to the embodiment of the present disclosure.
Figure 11:
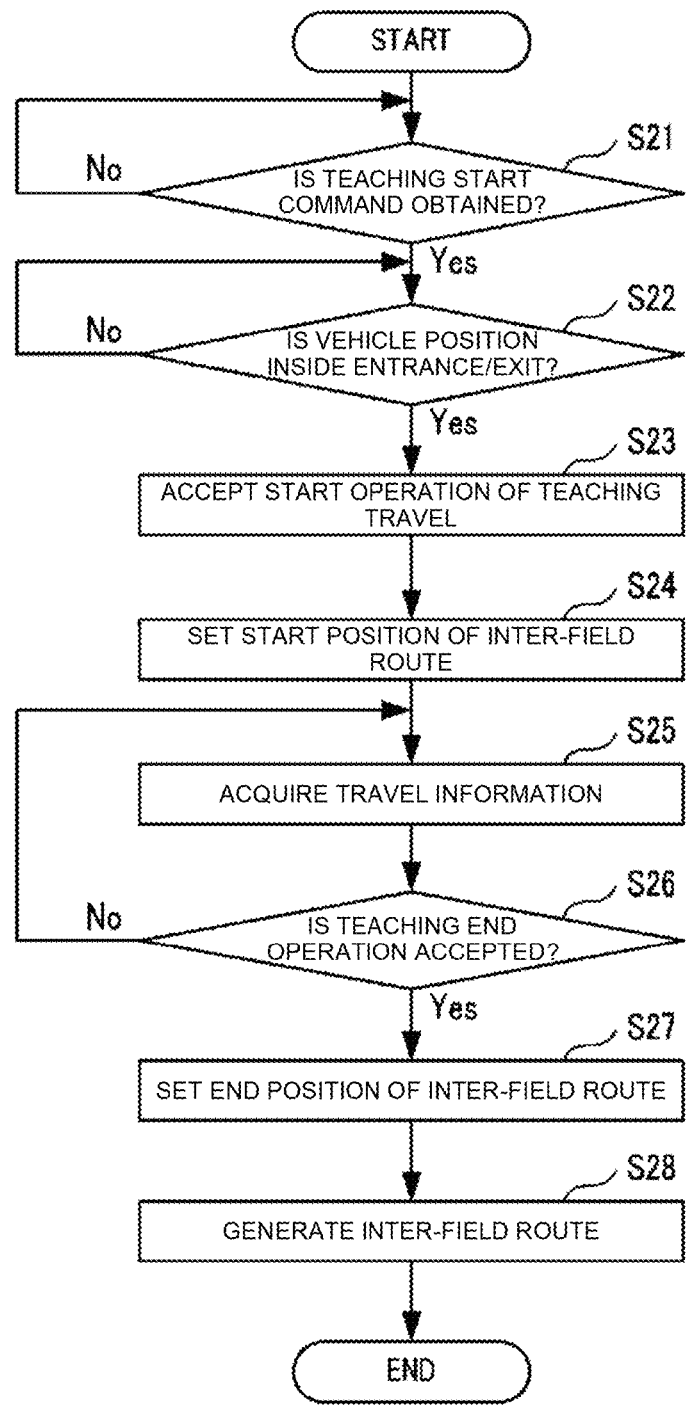
FIG. 11 is a flowchart illustrating an example of a procedure of a teaching process executed by the autonomous travel system according to the embodiment of the present disclosure.

FIG. 11 is a flowchart illustrating an example of a procedure of the teaching process (step S51 shown in FIG. 10). Here, it is assumed that the operator selects the field F1 and the field F2 as fields corresponding to the inter-field route.

In the teaching process, first, in step S21, the operation control unit 21 determines whether or not the teaching operation start command issued by the operator is acquired. If the operation control unit 21 acquires a teaching operation start command issued by the operator (S21: Yes), it moves the process to step S22. The operation control unit 21 waits until the operation control unit 21 acquires the teaching operation start command issued by the operator (S21: No).

In step S22, the operation control unit 21 determines whether or not the current position of the work vehicle 10 coincides with the position of the entrance/exit of the field. Here, the operation control unit 21 determines whether the work vehicle 10 is located at the entrance/exit H1 of the field F1 (see FIG. 4A). If the current position of the work vehicle 10 coincides with the position of the entrance/exit of the field (S22: Yes), the operation control unit 21 moves the process to step S23. The operation control unit 21 waits until the current position of the work vehicle 10 coincides with the position of the entrance/exit of the field (S22: No).

In step S23, the operation control unit 21 accepts the starting operation of the teaching travel. For example, on the teaching operation screen D2 illustrated in FIG. 6A, when the operator presses down a start button, the operation control unit 21 accepts the starting operation of the teaching travel.

Next, in step S24, the operation control unit 21 sets the start position of the inter-field route (route start position). Here, upon the operation control unit 21 accepts the start operation, the operation control unit 21 sets the current position of the work vehicle 10 which is located at the entrance/exit H1 of the field F1 as the route start position Ts1 (see FIG. 6A). This allows the operator to operate the teaching travel.

For example, the operator brings in the operation terminal 20 to the work vehicle 10 and manually drives the work vehicle 10 on the road R0 from the field F1 to the field F2 (see FIG. 3) while checking the guide route Mr (see FIG. 6A) displayed on the operation terminal 20.

Next, in step S25, the operation control unit 21 acquires travel information of the work vehicle 10 (position information, travel speed information, road information, or the like) while the operator causes the work vehicle 10 to perform the teaching travel.

Next, in step S26, the operation control unit 21 determines whether or not it accepts ending operation of the teaching travel from the operator. If the operation control unit 21 accepts the ending operation of the teaching travel from the operator (S26: Yes), it moves the process to step S27. The operation control unit 21 continues the process of acquiring the travel information according to the teaching travel by the operator (S26: No) until the operation control unit 21 accepts the ending operation of the teaching travel from the operator. For example, upon the work vehicle 10 reaches the entrance/exit H2 of the field F2, the operator performs the ending operation of the teaching travel (see FIG. 6B).

In step S27, the operation control unit 21 sets the end position of the inter-field route (route end position). Here, if the operation control unit 21 accepts the ending operation, it sets the current position of the work vehicle 10 which is located at the entrance/exit H2 of the field F2 as the route end position Te2 (see FIG. 6C).

In step S28, the operation control unit 21 generates the inter-field route. Specifically, the operation control unit 21 generates the inter-field route R12 for causing the work vehicle 10 to travel autonomously between the field F1 and the field F2 based on the position information of the work vehicle 10. For example, as shown in FIG. 7, the operation control unit 21 generates the inter-field route R12 which connects the route start position Ts1 at the entrance/exit H1 of field F1 and the route end position Te2 at the entrance/exit H2 of field F2 and passes through the road R0.

The operation control unit 21 notifies the operator of whether or not to register the generated inter-field route R12 on the teaching operation screen D2 illustrated in FIG. 6C. If the operator confirms the inter-field route R12 on the teaching operation screen D2 and presses down the registration button, the operation control unit 21 acquires a command to register the inter-field route R12 and registers the inter-field route R12 in association with the field F1 and the field F2 (see FIG. 8).

The operation control unit 21 executes the teaching process as mentioned above and sets the inter-field route R12 generated in the teaching process as the inter-field route between the field F1 and the field F2 in Step S52 (see FIG. 10).

As mentioned above, the operation control unit 21 executes the autonomous travel process. The work vehicle 10 performs a predetermined work while traveling autonomously in each of the plurality of fields and travels autonomously between the fields based on the route data transferred from the operation control unit 21. The teaching process illustrated in FIG. 11 may be executed at the time when the work vehicle 10 starts work or during the time when the work vehicle 10 does not perform work.

As described above, the autonomous travel system 1 according to the present embodiment accepts the travel operation by the operator, acquires the position information of the work vehicle 10 traveling based on the travel operation on the road R0 that connects the field F1 and the field F2 (an example of a connecting road of the present disclosure), and generates the inter-field route R12 (an example of the inter-field route of the present disclosure) for causing the work vehicle 10 to autonomously travel between the field F1 and the field F2 based on the position information of the work vehicle 10.

According to the configuration described above, it is possible to generate a route for causing the work vehicle to autonomously travel between a plurality of fields in accordance with the travel operation by the operator (manually travel operation). This allows the work vehicle 10 to surely travel autonomously between the plurality of fields. In addition, it is possible to improve work efficiency since the work vehicle can autonomously travel between the plurality of fields from the next time by storing the inter-field route on which the work vehicle manually travels between the fields once. Therefore, the work vehicle 10 can automatically perform work in the plurality of fields sequentially.

The present disclosure is not limited to the embodiment described above, but may be the following embodiments.

Figure 12A:
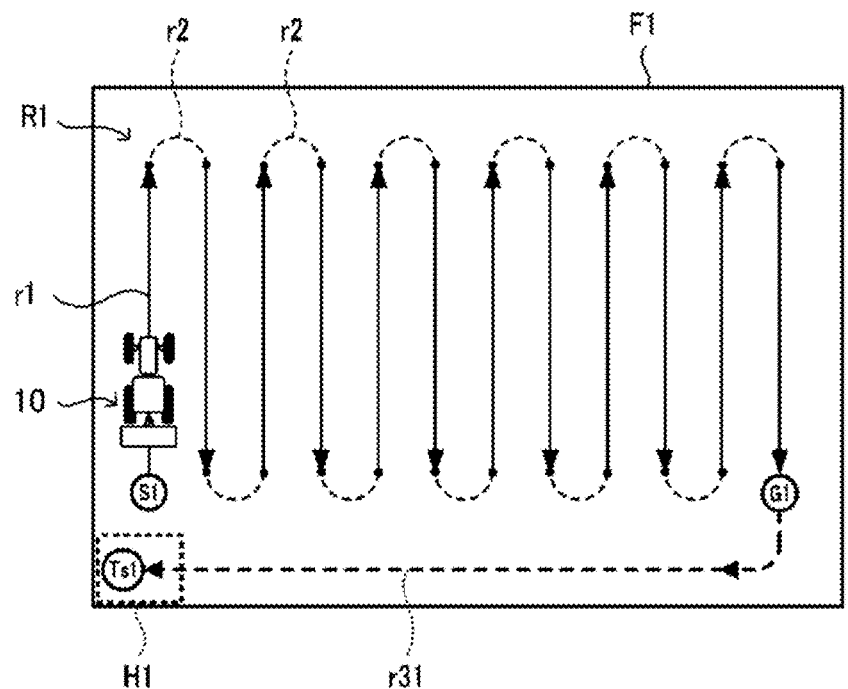
FIG. 12A is a diagram illustrating an example of an interpolation route for the work vehicle according to the embodiment of the present disclosure.

As indicated in FIG. 12A, the operation control unit 21 may generate a route (interpolation route r31) for causing the work vehicle 10 to autonomously travel from the travel end position G1 to the route start position Ts1. Specifically, when the operation control unit 21 sets the route start position Ts1 in the field F1 (see FIG. 6A), the operation control unit 21 generates the interpolation route r31 that connects the travel end position G1 of the target route R1 in the field F1 and the route start position Ts1.

Figure 12B:
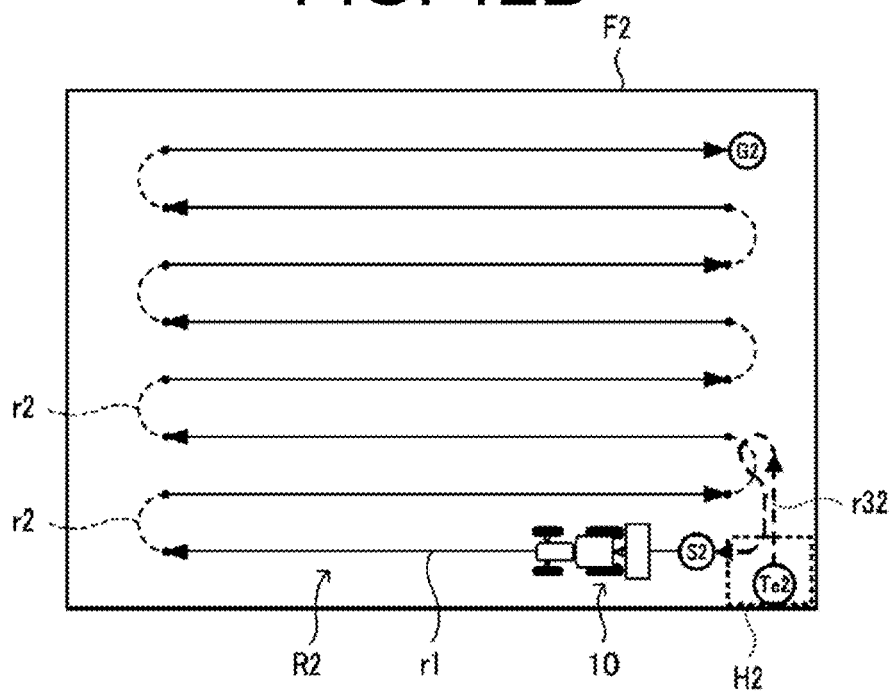
FIG. 12B is a diagram illustrating another example of an interpolation route for the work vehicle according to the embodiment of the present disclosure.

Furthermore, as indicated in FIG. 12B, the operation control unit 21 may generate a route (interpolation route r32) for causing the work vehicle 10 to autonomously travel from the route end position Te2 to the travel start position S2. Specifically, when the operation control unit 21 sets the route end position Te2 in the field F2 (see FIG. 6C), the operation control unit 21 generates the interpolation route r32 that connects the route end position Te2 and the travel start position S2 of the target route R1 in the field F2.

The operation control unit 21 registers the generated interpolation routes r31 and r32 in association with the inter-field route R12 of the field F1 and the field F2. This allows the work vehicle 10 to travel autonomously on the entire route from the travel start position S1 in the field F1 to the travel end position G2 in the field F2.

When the work vehicle 10 moves to the field F1 to perform work in the field F1 after performing work in the field F2, the operation control unit 21 generates in the field F2 the interpolation route that connects the travel end position G2 of the target route R2 and the route start position (the same position as the route end position Te2) and generates in the field F1 the interpolation route that connects the route end position (the same position as the route start position Ts1) and the travel start position S1 of the target route R1. That is, in the present disclosure, in the case where a first target route for causing the work vehicle 10 to autonomously travel is set in the first field and a second target route for causing the work vehicle to autonomously travel is set in the second field, the operation control unit 21 generates a first interpolation route that connects the start position or the end position of the first target route and a first end point (route start position or route end position) and a second interpolation route that connects the start position or the end position of the second target route and a second end point (route start position or route end position).

Figure 13:
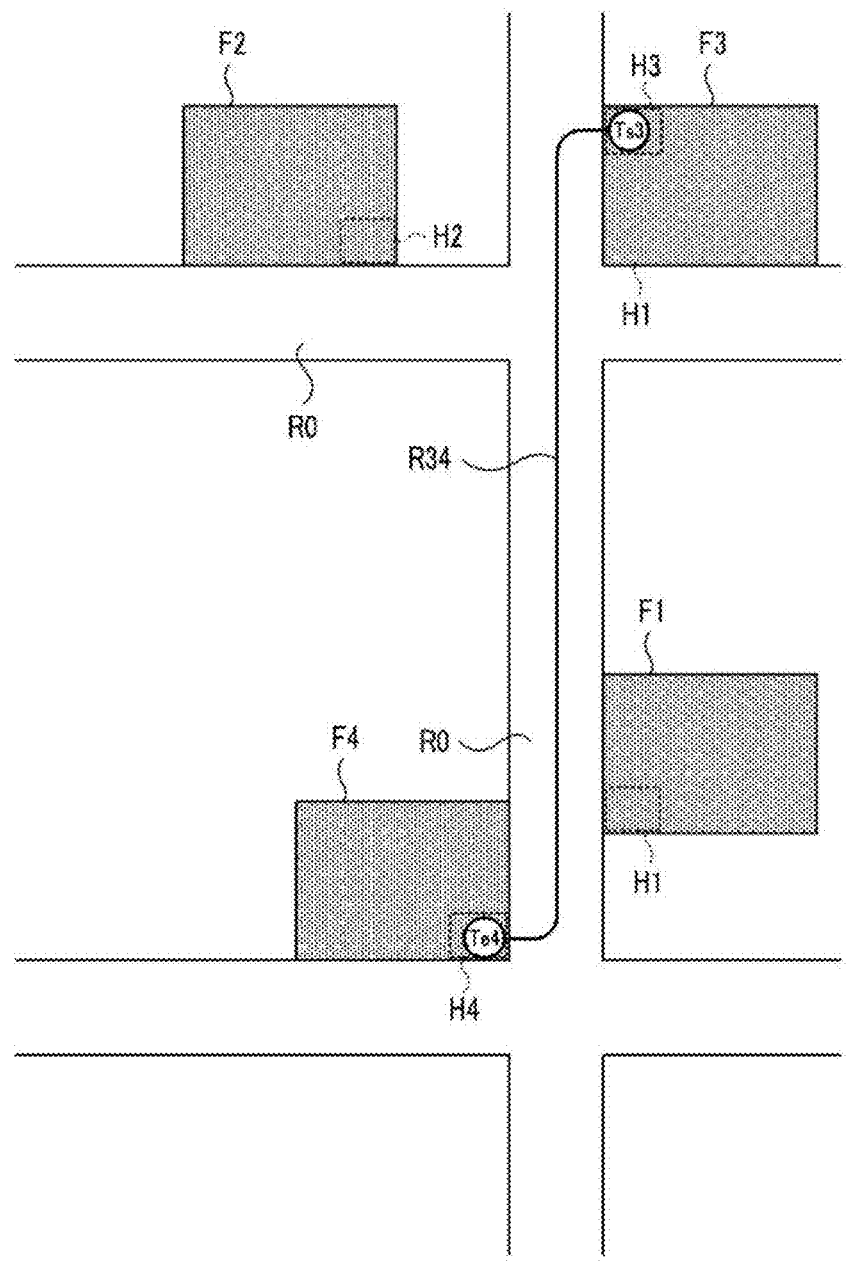
FIG. 13 is a diagram illustrating an example of an inter-field route for the work vehicle according to the embodiment of the present disclosure.

As another embodiment of the present disclosure, the operation control unit 21 may generate the inter-field route that connects between other multiple fields using at least a part of the inter-field route that is already registered. For example, when the inter-field route R12 (see FIG. 7) that connects the field F1 and the field F2 and an inter-field route R34 (see FIG. 13) that connects a field F3 and a field F4 are registered (see FIG. 8), the operation control unit 21 generates an inter-field route connecting between other fields using at least a part of the inter-field route R12 and the inter-field route R34, Specifically, as illustrated in FIG. 14, the operation control unit 21 generates an inter-field route R13 between the field F1 and the field F3 using a partial route R12a which is a part of the inter-field route R12 and a partial route R34a which is a part of the inter-field route R34.

Figure 14:
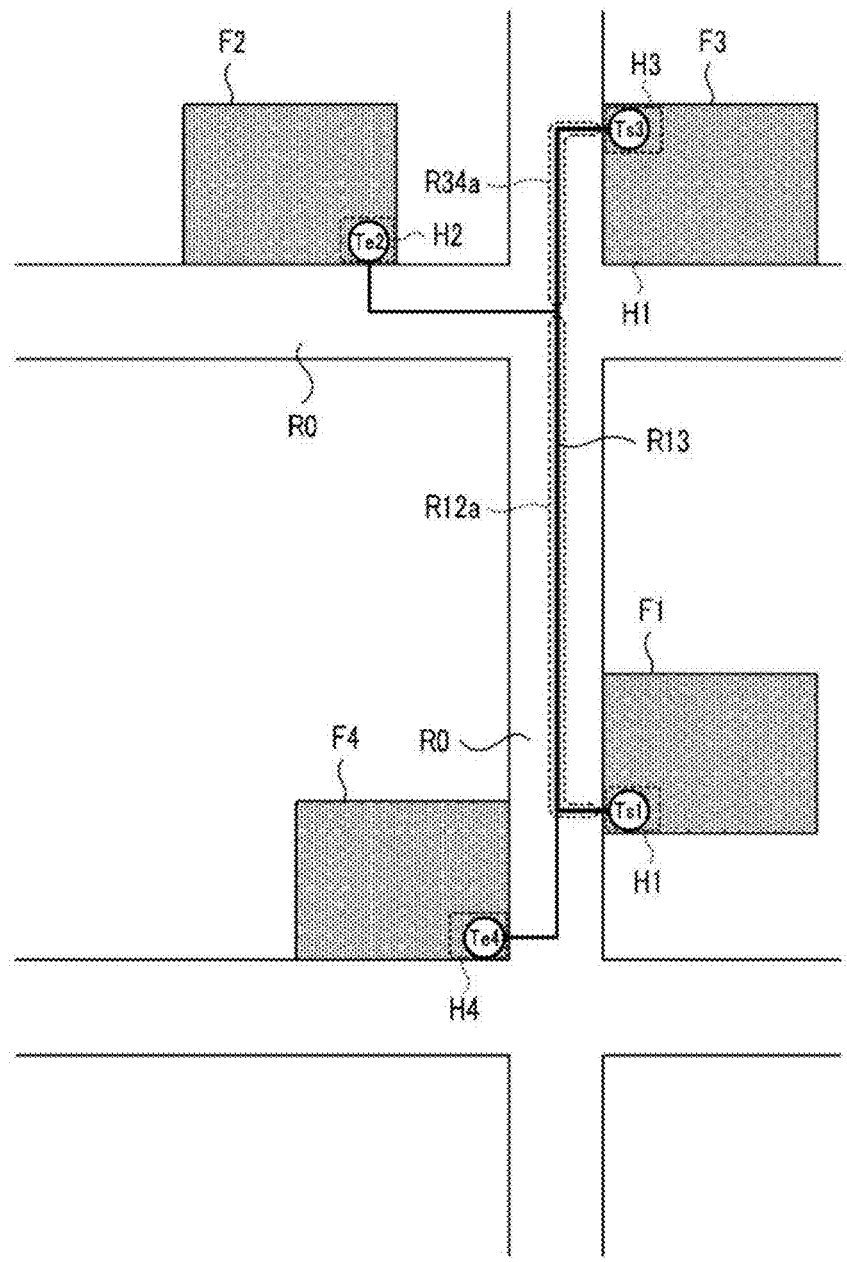
FIG. 14 is a diagram illustrating another example of an inter-field route for the work vehicle according to the embodiment of the present disclosure.

In an example illustrated in FIG. 14, the operation control unit 21 can generate a plurality of inter-field routes which connect between the fields F1 to F4 using the registered inter-field routes R12 and R34.

Figure 15:
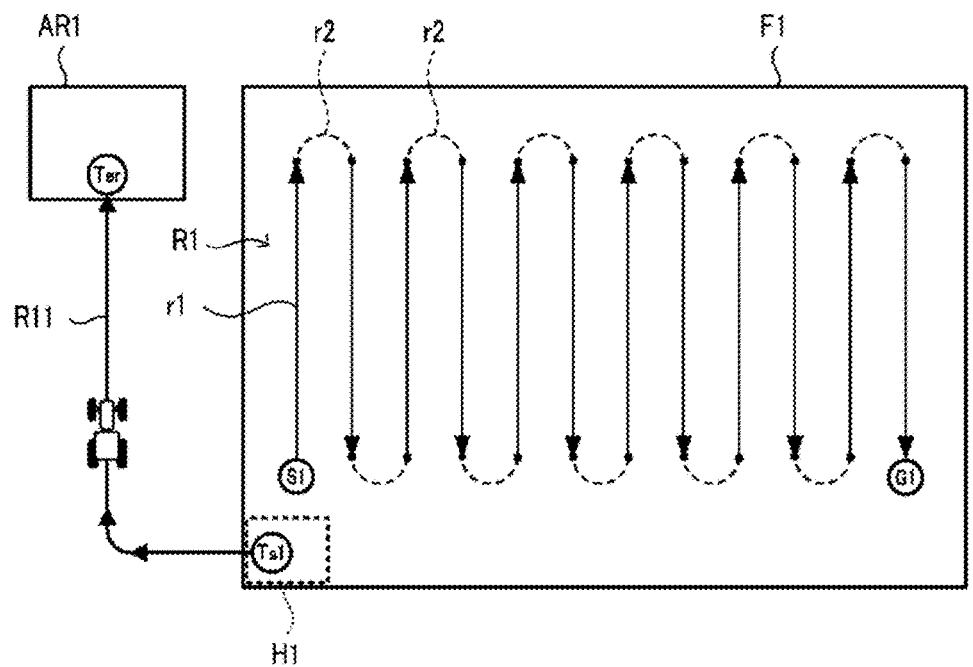
FIG. 15 is a diagram illustrating an example of an inter-area route for the work vehicle according to the embodiment of the present disclosure.

In the embodiments described above, the field F1 and the field F2 are described examples of the first area and the second area of the present disclosure, respectively. However, the first area and the second area of the present disclosure are not limited to the field. For example, as illustrated in FIG. 15, the first area may be the field F1 and the second area may be a supply area AR1 for supplying a supply material (fuel, a seedling, a fertilizer, a spraying material, or the like) to the work vehicle 10. The operation control unit 21 generates a route R11 (an example of an inter-area route of the present disclosure) that connects the field F1 and the supply area AR1 in accordance with the teaching operation by the operator.

For example, the work vehicle 10 autonomously travels on the route R11 from the route start position Ts1 in the middle of performing work in the field F1 and executes supply process in the supply area AR1 when the work vehicle 10 reaches a route end position Ter. When finishing the supply process, the work vehicle 10 autonomously travels on the route R11 to return to the field F1 and resume the work. According to the configuration described above, the work vehicle 10 can autonomously travel to the supply area AR1 in the middle of performing work and then autonomously travel from the supply area AR1 to the field F1, thereby improving work efficiency.

In the configuration described above, the work vehicle 10 may autonomously travel from the field F1 to the supply area AR1 and then autonomously travel from the supply area AR1 to the field F2. In this case, the operation control unit 21 generates the route R11 that connects the field F1 and the supply area AR1 and a route that connects the supply area AR1 and the field F2. In this way, in the case where the work vehicle 10 moves from one field to another field via a relay point, the operation control unit 21 may generates a route that connects the one field and the relay point and a route that connects the relay point and the another field in accordance with the teaching operation by the operator. The first area and the second area may be discharge areas where a discharge material (harvest or the like) is discharged from the work vehicle 10 and may be storage areas (barn or the like) for the work vehicle 10. That is, each of the first area and the second area is a field, a supply area for supplying a supply material to the work vehicle 10, a discharge area for discharging a discharge material from the work vehicle 10, or a storage area for the work vehicle 10.

Furthermore, in another embodiment of the present disclosure, for example, the inter-field route R12 generated by performing teaching travel from the field F1 to the field F2 may be used as a route on which the work vehicle 10 moves from field F1 to field F2, and may be used as a route on which the work vehicle 10 moves from the field F2 to the field F1.

In the embodiment described above, the operation control unit 21 generates the inter-field route of the road R0 connecting between multiple fields based on teaching operation by the operator, but the present disclosure is not limited thereto. In another embodiment, the operation control unit 21 may generate the inter-field route based on a traveling locus on which the work vehicle 10 travels in the past. For example, when the work vehicle 10 performs work in the field F1 and the field F2, the operator manually drives the work vehicle 10 from the field F1 to the field F2 to perform work in field F2 after the work in the field F1 is completed. The operation control unit 21 generates a route connecting between the field F1 and the field F2 based on a locus on which the work vehicle 10 travels during work. In this way, the operation control unit 21 may generate the inter-field route based on the locus on which the operator causes the work vehicle 10 to manually drive during a normal operation.

Announcement Process of Travel Information

When the work vehicle 10 is to be traveled autonomously on the inter-field route that connects one field and another field (inter-area route), it is necessary to pay attention to safety of the inter-field route in order to avoid such an accident that the work vehicle 10 contacts with other vehicles or the like. The autonomous travel system 1 according to the present embodiment is configured to be able to improve safety and work efficiency in the work vehicle 10 that travels autonomously between multiple fields, as described below.

Specifically, the travel processor 111 causes the work vehicle 10 to be stopped (temporarily stopped) at the end point of the inter-field route. The announcement process unit 112 also causes the work vehicle 10 to announce travel information associated with traveling on the inter-field route in the field.

Figure 16:
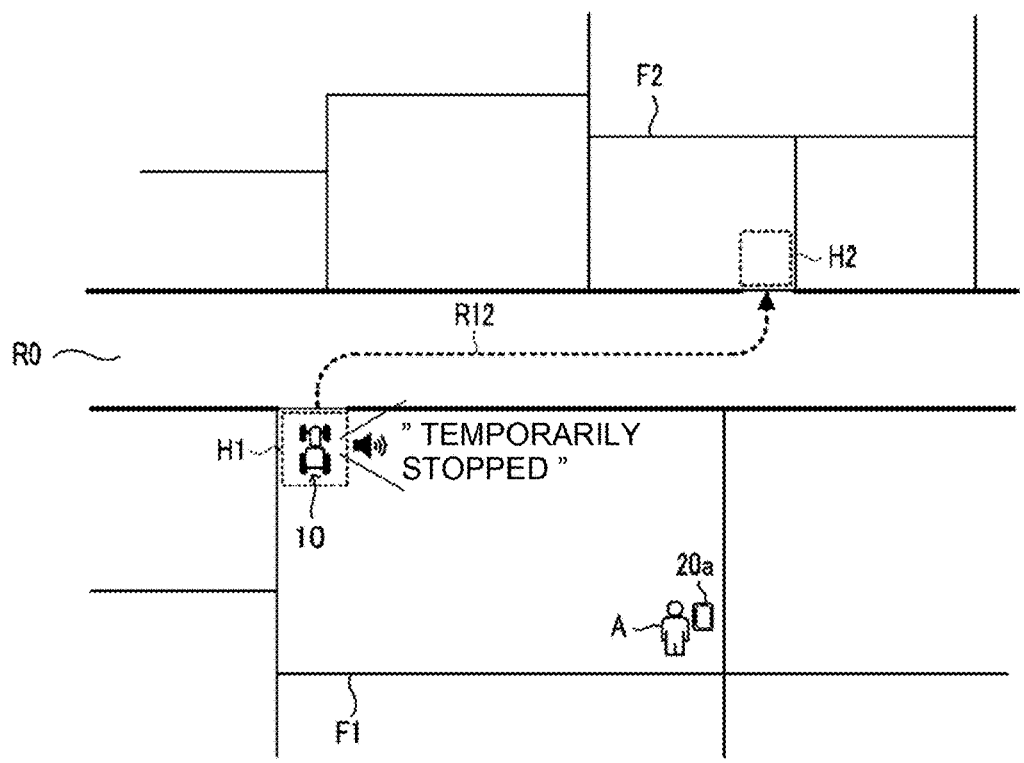
FIG. 16 is a diagram illustrating an example of announcement by the work vehicle according to the embodiment of the present disclosure.

FIG. 16 shows an example in which the work vehicle 10 travels on the inter-field route R12 and moves to the field F2 after finishing work in the field F1. As shown in FIG. 12A, when the work vehicle 10 finishes work along the target route R1 in the field F1, the travel processor 111 causes the work vehicle 10 to autonomously travel on the interpolation route r31 from the travel end position G1 to the route start position Ts1 of the inter-field route R12. The route start position Ts1 is set at the entrance/exit H1 of the field F1, for example, as shown in FIG. 16. When the work vehicle 10 reaches the route start position Ts1 of the inter-field route R12, the travel processor 111 causes the work vehicle 10 to be stopped temporarily at the route start position Ts1.

After the travel processor 111 causes the work vehicle 10 to be stopped at the route start position Ts1, the announcement process unit 112 causes the work vehicle 10 and the operation terminal 20 to announce the travel information. The travel information includes at least one of stop information indicating that the work vehicle 10 stops and inquiry information inquiring whether or not to cause the work vehicle 10 to resume traveling. The operation terminal 20 which makes an announcement may be an operation terminal operated by the operator of the work vehicle 10 or an operation terminal operated by a supervisor who monitors the work vehicle 10. That is, the user of the present disclosure include the operator, the supervisor, the worker, etc.

For example, as shown in FIG. 16, the announcement process unit 112 causes the work vehicle 10 to audibly output the stop information (a message such as "TEMPORARILY STOPPED"). In this way, the announcement process unit 112 causes the work vehicle 10 to audibly output a message regarding the stop information in order to attract attention over an area around the work vehicle 10. The announcement process unit 112 may turn on or flicker an indicator light mounted on the work vehicle 10.

Figure 17:
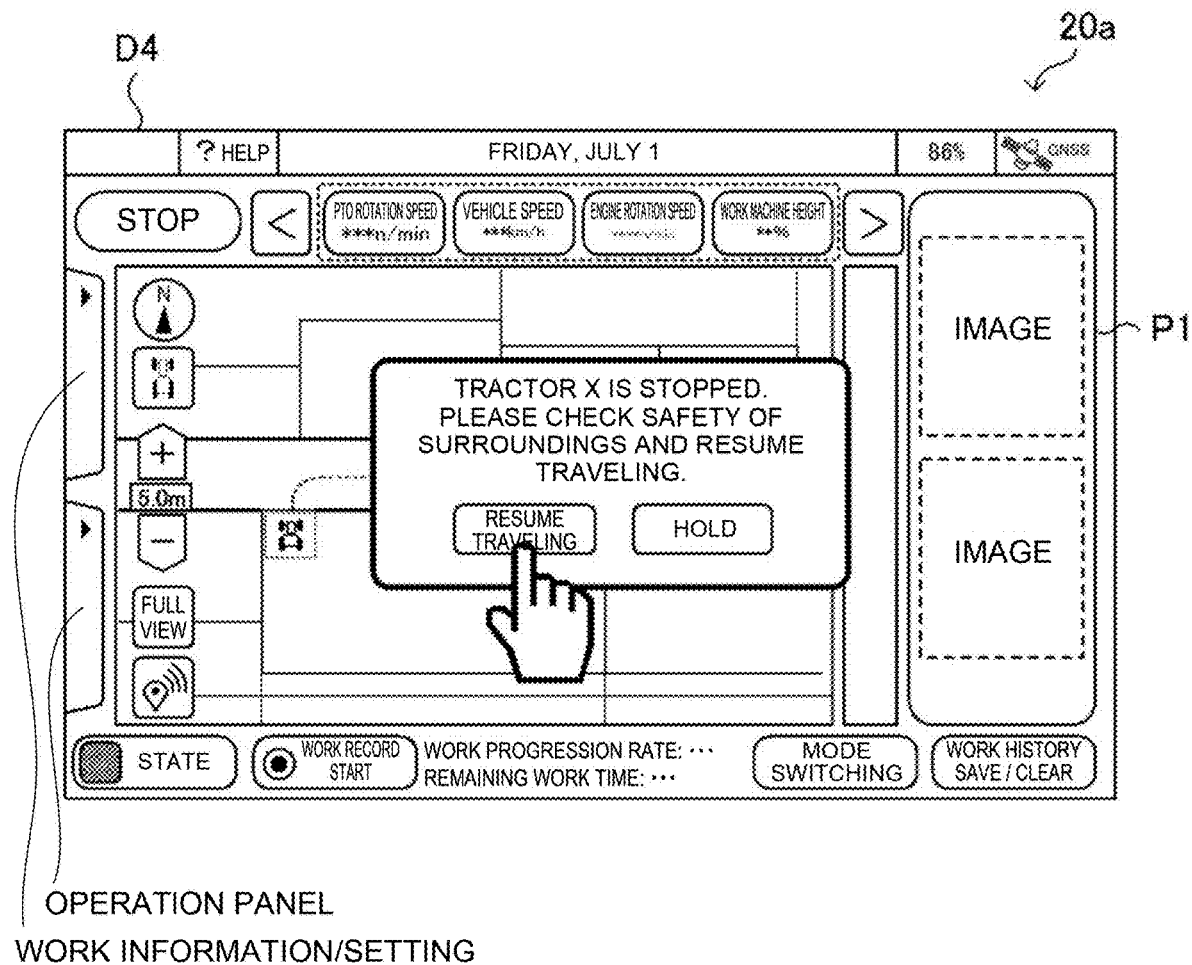
FIG. 17 is a diagram illustrating an example of a travel screen of the operation terminal according to the embodiment of the present disclosure.

In addition, the announcement process unit 112 causes the operation terminal 20 to display the stop information and the inquiry information. For example, as shown in FIGS. 16 and 17, the announcement process unit 112 causes the travel screen D4 of the operation terminal 20a of an operator A of the work vehicle 10 (tractor X) located in the field F1 to display the stop information (a message such as "TRACTOR X IS STOPPED. PLEASE CHECK SAFETY OF SURROUNDINGS AND RESUME TRAVELING.") and the inquiry information ("RESUME TRAVELING" button and "HOLD" button). This allows the operator A to recognize that the work vehicle 10 stops temporarily at the entrance/exit H1 of the field F1.

On the travel screen D4 (see FIG. 17), the operator A can issue a command to cause the work vehicle 10 to cancel the temporary stopping state and resume the autonomous travel. For example, after moving to the stop position of the work vehicle 10 to visually confirm the safety of the surroundings of the work vehicle 10 and the road R0, the operator A presses down "RESUME TRAVELING" button on the travel screen D4 shown in FIG. 17. Upon the operator A presses down the "RESUME TRAVELING" button, the operation control unit 21 of the operation terminal 20 accepts operation by the operator A and issues a travel resumption instruction to the work vehicle 10.

Upon the travel processor 111 acquires the travel resumption instruction from the operation terminal 20, it lifts the temporary stopping state at the route start position Ts1 and causes the work vehicle 10 to resume autonomous travel. That is, the travel processor 111 causes the work vehicle 10 to initiate autonomous travel along the inter-field route R12 from the route start position Ts1.

Figure 18:
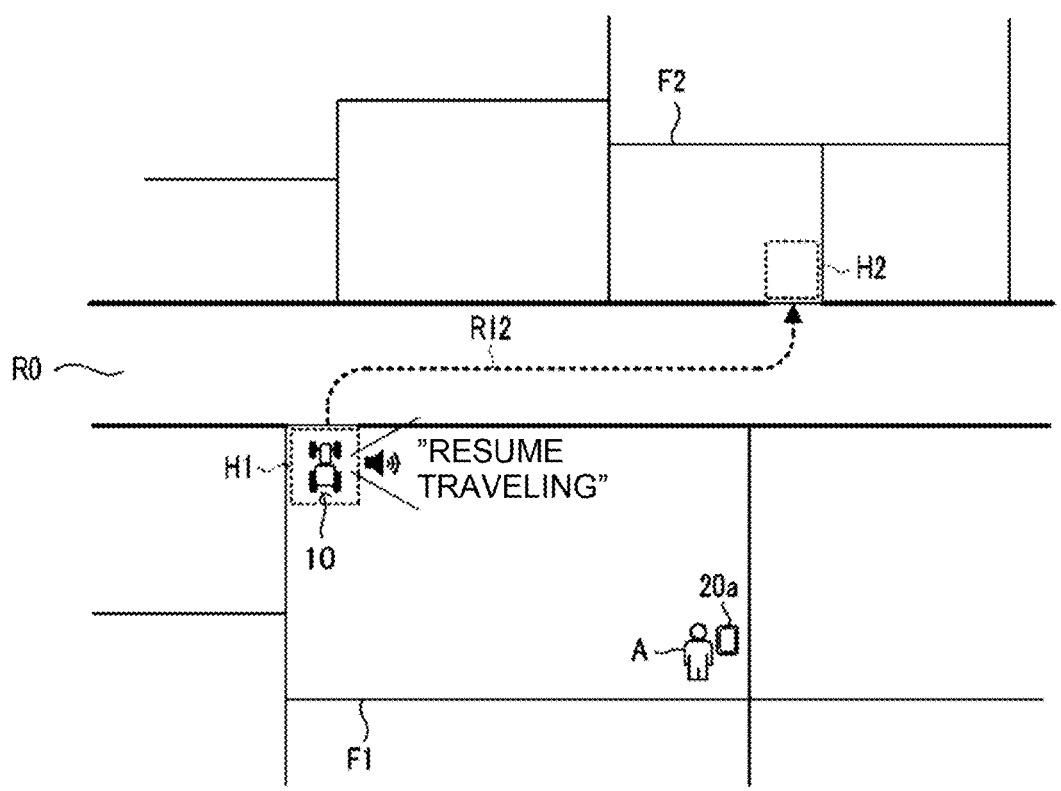
FIG. 18 is a diagram illustrating another example of announcement by the work vehicle according to the embodiment of the present disclosure.

In addition, the announcement process unit 112 causes the work vehicle 10 to announce resumption information indicating that the work vehicle 10 resumes autonomous travel when the travel processor 111 causes the work vehicle 10 to resume the autonomous travel. For example, as shown in FIG. 18, the announcement process unit 112 causes the work vehicle 10 to audibly output the resumption information (a message such as "RESUME TRAVELING"). In this way, the announcement process unit 112 causes the work vehicle 10 to audibly output a message regarding the stop information in order to attract attention over the area around the work vehicle 10. In addition, the announcement process unit 112 causes the operation terminal 20 to display the resumption information.

The announcement process unit 112 may also cause the travel screen D4 to display an image P1 captured by the camera mounted on the work vehicle 10 (see FIG. 17). If the operation terminal 20 is located within a predetermined distance from the work vehicle 10, the operator of the operation terminal 20 can move close to the work vehicle 10 and visually confirm the safety. Therefore, the announcement process unit 112 may cause the screen to display the image P1 when the operation terminal 20 is located beyond the predetermined distance from the work vehicle 10 and cause the screen not to display the image P1 when the operation terminal 20 is located within the predetermined distance from the work vehicle 10. The image P1 may include a front image, a left side image, a right side image, a rear image of the work vehicle 10, which are captured by the camera.

Provided that the operator visually confirms the safety, the vehicle control device 11 may lift the temporarily stopping state of the work vehicle 10 and resume autonomous travel. Specifically, the announcement process unit 112 causes the operation terminal 20 to display the stop information when the work vehicle 10 stops at the route start position Ts1, and to display the inquiry information when the operation terminal 20 is within the predetermined distance from the work vehicle 10. For example, when the travel processor 111 causes the work vehicle 10 to be stopped at the route start position Ts1, the announcement process unit 112 causes the travel screen D4 of the operation terminal 20 to display that the work vehicle 10 is being stopped and not to display a "RESUME TRAVELING" button. When the operator A approaches the work vehicle 10 to resume the autonomous travel of the work vehicle 10 and enters within a range of the predetermined distance, the announcement process unit 112 causes the travel screen D4 to display the "RESUME TRAVELING" button. This allows the operator A to press down the "RESUME TRAVELING" button when the operator A approaches up to a position capable of visually confirming the surroundings of the work vehicle 10. That is, the operator A cannot resume the autonomous travel of the work vehicle 10 if the operator is at a position beyond the predetermined distance from the work vehicle 10. This configuration ensures that the operator A can surely check the surroundings of the work vehicle 10 before causing the work vehicle 10 to autonomously travel on the road R0.

Figure 19:
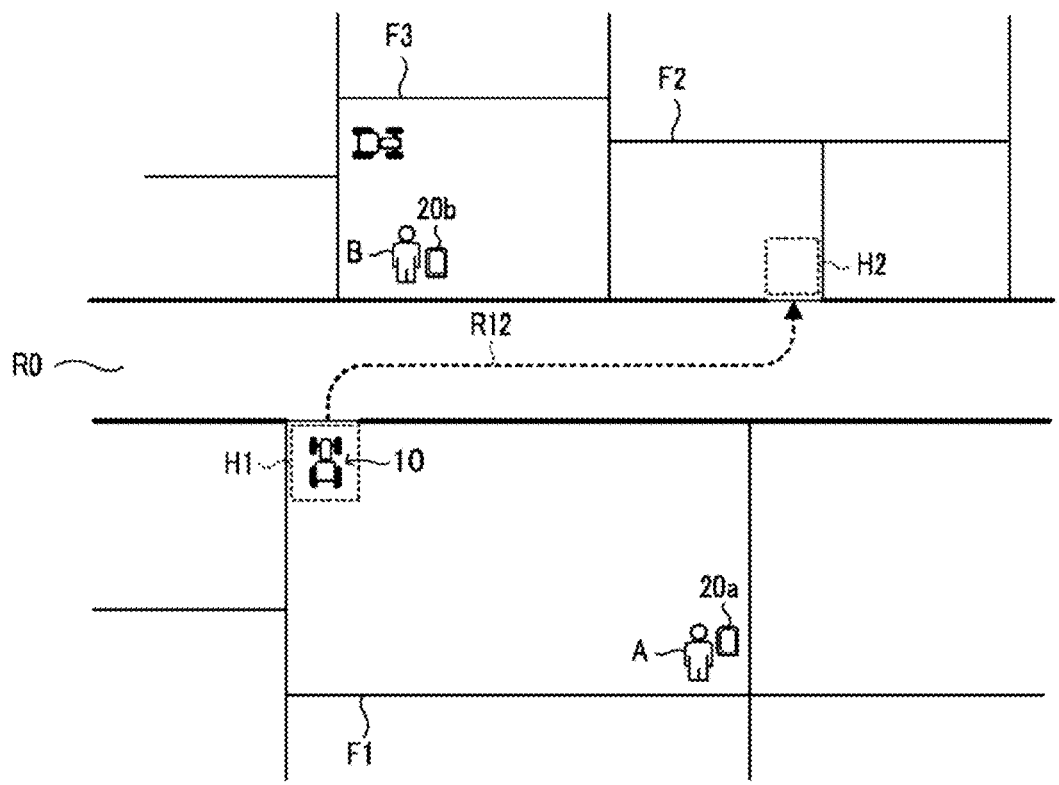
FIG. 19 is a diagram illustrating an example of the arrangement of a plurality of operation terminals according to an embodiment of the present disclosure.

In another embodiment, the vehicle control device 11 may cause a plurality of operation terminals 20 to announce the travel information. For example, FIG. 19 shows the field F1 and the field F2 in which the work vehicle 10 (tractor X) performs work, and a field F3 in which another work vehicle performs work. The work vehicle 10 travels autonomously along the inter-field route R12 and moves from the field F1 to the field F2. The operator A manages the work in the field F1 and the field F2, while the operator B manages the work in the field F3.

In this case, the announcement process unit 112 causes the operation terminal 20a of the operator A being in the field F1 to display the stop information and the inquiry information as the travel information, and causes the operation terminal 20b of the operator B being in the field F3 which is not connected to the inter-field route R12 to display only the stop information as the travel information. In this way, the announcement process unit 112 causes each of the plurality of operation terminals 20 to display information indicating that the work vehicle 10 is temporarily stopped as well as causes the operation terminal 20a of the operator A who manages the work vehicle 10 traveling autonomously along the inter-field route R12 to display information inquiring whether or not to resume the autonomous travel.

That is, the vehicle control device 11 notifies the operators around the work vehicle 10 of that the work vehicle 10 intends to travel on the road R0, and gives authority (permission) to issue a command to cause the work vehicle 10 to travel on the road R0 (travel resumption authority) only to the operator A who manages the work vehicle 10. In the example shown in FIG. 19, for example, this allows the operator B being in the field F3 to also recognize that the work vehicle 10 in the field F1 intends to travel on the road R0, thereby visually confirming the safety of the road R0.

Figure 20:
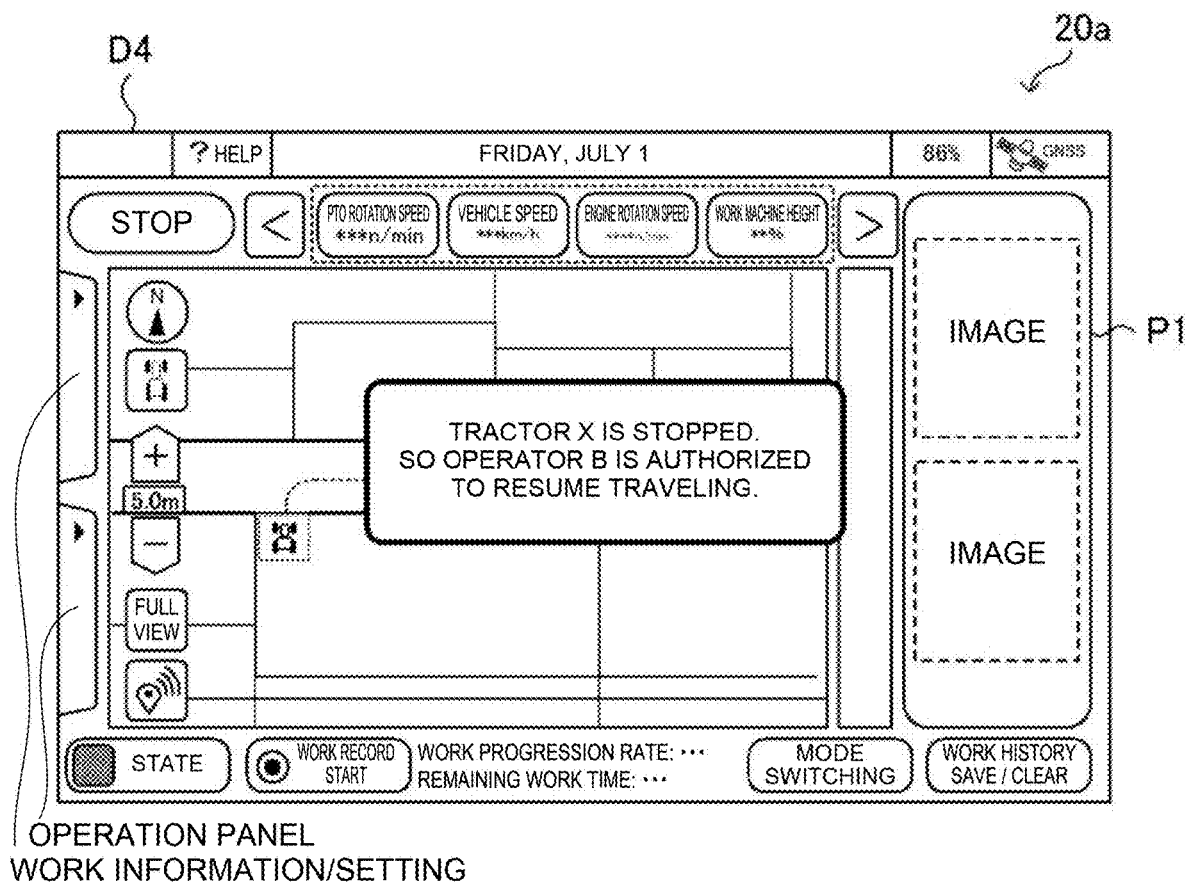
FIG. 20 is a diagram illustrating another example of a travel screen of the operation terminal according to the embodiment of the present disclosure.

In another embodiment, the vehicle control device 11 may notify another operator of the inquiry information if the operator A does not issue the command to resume autonomous travel of the work vehicle 10 which is temporarily stopped (travel resumption command). For example, in the example shown in FIG. 19, when the announcement process unit 112 causes the operation terminal 20a to display the "RESUME TRAVELING" button as the inquiry information, the operator A may not notice the notification and not press down the "RESUME TRAVELING" button. In this case, the announcement process unit 112 causes an operation terminal 20b of the operator B to display the inquiry information ("RESUME TRAVELING" button). As shown in FIG. 20, the announcement process unit 112 may cause the operation terminal 20a to display that the inquiry information is notified of the operator B (travel resumption authority is given).

Figure 21:
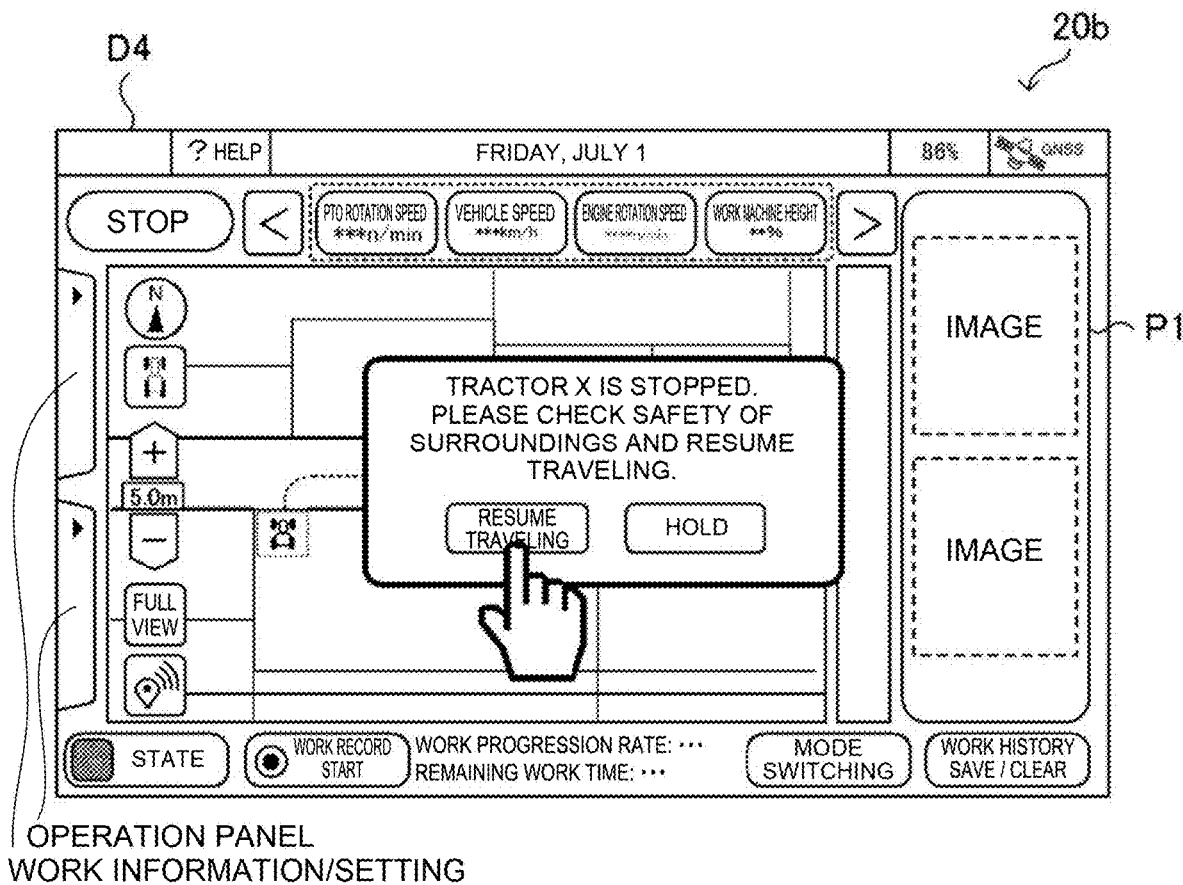
FIG. 21 is a diagram illustrating another example of the travel screen of the operation terminal according to the embodiment of the present disclosure.

FIG. 21 shows an example of the travel screen D4 of the operation terminal 20b. When the operator B being in the field F3 confirms the inquiry information, he/she moves to the stop position of the work vehicle 10 in the field F1, visually checks the safety of the surroundings of the work vehicle 10 and the road R0, and presses down the "RESUME TRAVELING" button on the travel screen D4. Upon the operator B presses down the "RESUME TRAVELING" button (see FIG. 21), the operation control unit 21 of the operation terminal 20b accepts operation by the operator B and issues a travel resumption instruction to the work vehicle 10.

The announcement process unit 112 may cause the operation terminal 20b to announce the travel information (the inquiry information) if the announcement process unit 112 does not obtain the travel resumption instruction until a predetermined time elapses after the announcement process unit 112 causes the operation terminal 20a to announce the travel information (the inquiry information). Specifically, the announcement process unit 112 may cause the operation terminal 20b to display the inquiry information if the announcement process unit 112 does not obtain the travel resumption instruction from the operation terminal 20a within a predetermined time period after notifying the operator A. That is, the vehicle control device 11 gives (transfers) authority to issue the travel resumption command to another operator if the operator of the work vehicle 10 does not issue the travel resumption command within the predetermined time period.

Figure 22:
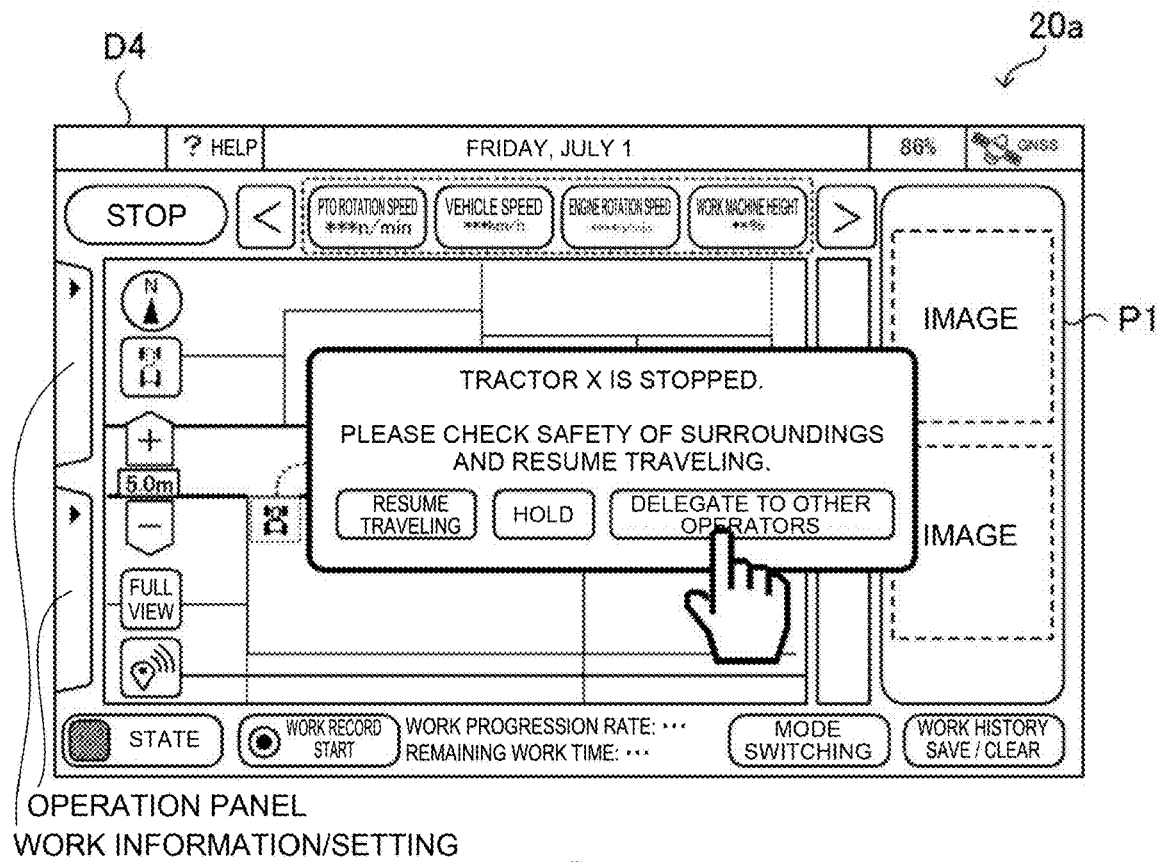
FIG. 22 is a diagram illustrating another example of the travel screen of the operation terminal according to the embodiment of the present disclosure.

The announcement process unit 112 may also perform operation in which the operator A delegates authority to issue the travel resumption command to another operator (e.g., operator B) after the announcement process unit 112 causes the operation terminal 20a to announce the travel information (the inquiry information). For example, if the operator A cannot move to the work vehicle 10 because he/she is busy working, the operator A performs operation to delegate the authority to issue the travel resumption command to the operator B (e.g., pressing down the "DELEGATE TO OTHER OPERATORS" button) on the operation terminal 20a as shown in FIG. 22. The announcement process unit 112 causes the operation terminal 20b to display the inquiry information in response to the operation by operator A.

According to this configuration, even if the operator A being in the field F1 cannot issue the travel resumption command, another operator B can move to the stop position of the work vehicle 10, visually check the safety of the surroundings of the work vehicle 10 and the road R0, and cause the work vehicle 10 to resume autonomous travel.

Figure 23:
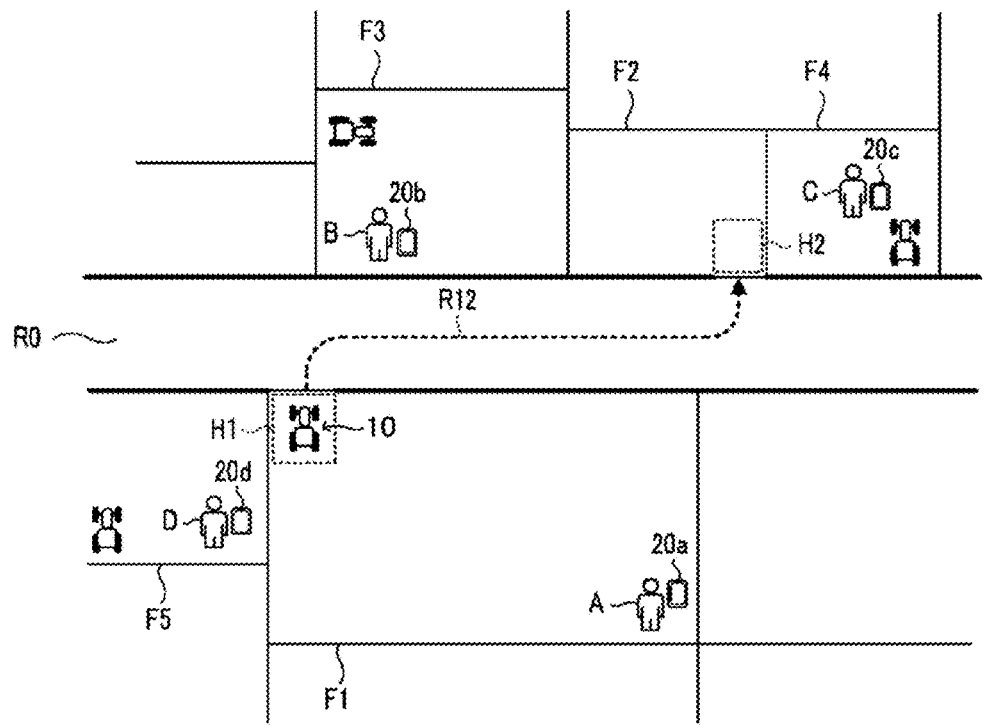
FIG. 23 is a diagram illustrating another example of the arrangement of a plurality of operation terminals according to an embodiment of the present disclosure.

In another embodiment, the vehicle control device 11 may notify a plurality of other operators of the inquiry information if the operator A does not issue a command to resume autonomous travel of the work vehicle 10 which is temporarily stopped (travel resumption command). An example shown in FIG. 23 shows the fields F1 and F2 where the work vehicle 10 (tractor X) performs work and fields F3 to F5 where other work vehicles 10 perform work, for example. The work vehicle 10 travels autonomously along the inter-field route R12 and moves from the field F1 to the field F2. The operator A manages the work in the fields F1 and F2, the operator B manages the work in the field F3, an operator C manages the work in the field F4, and an operator D manages the work in the field F5.

In this case, the announcement process unit 112 causes the operation terminal 20a of the operator A being in the field F1 to display the stop information and the inquiry information as the travel information, and causes the operation terminals 20b to 20d of the operators B to D being in the fields F3 to F5 which are not connected to the inter-field route R12 to display the stop information as the travel information. Furthermore, the announcement process unit 112 causes the operation terminal 20 that is determined based on priority among the plurality of operation terminals 20b to 20d to display the inquiry information. For example, in the example shown in FIG. 23, the announcement process unit 112 causes the operation terminal 20d closest to the work vehicle 10 among the operation terminals 20b to 20d to display the inquiry information ("RESUME TRAVELING" button). In this way, by giving authority to issue the travel resumption command to the operator D of the operation terminal 20d closest to the work vehicle 10, the safety confirmation can be performed quickly when the work vehicle 10 travels on the road R0. Thus, the announcement process unit 112 gives (transfers) the authority to issue the travel resumption command to the operator according to priority when the operator A does not issue the travel resumption command within the predetermined time period, or when the operator A performs operation to delegate the authority to issue the travel resumption command to another operator.

The vehicle control device 11 may set the priority in the order closer to the work vehicle 10. In this case, for example, the announcement process unit 112 causes the operation terminal 20b with the second highest priority, which is next closest to the work vehicle 10, to display the inquiry information if the announcement process unit 112 does not obtain the travel start command from the operator D of the operation terminal 20d with the first highest priority, which is closest to the work vehicle 10. Specifically, the announcement process unit 112 gives (transfers) the authority to issue the travel resumption command to the operator B when the operator D does not issue the travel resumption command within the predetermined time period, or when the operator D performs operation to delegate the authority to issue the travel resumption command to another operator.

The vehicle control device 11 may also cause the operation terminal 20 of the operator, where the work vehicle to be managed by the operator does not perform work, among the plurality of operation terminals 20b to 20d to display the inquiry information. For example, if the work vehicle in the field F3 and the work vehicle in the field F5 are performing work, and the work vehicle in the field F4 is not performing work, the operator C in the field F4 is in a work situation where he/she has a light workload. In this case, the announcement process unit 112 may cause the operation terminal 20c of the operator C to display the inquiry information. In this way, the announcement process unit 112 may transfer authority to issue the travel resumption command based on the priority according to the work situation.

In another embodiment, the announcement process unit 112 may cause the work vehicle to announce the travel information before the work vehicle reaches the route start position Ts1 of the inter-field route R12. Specifically, the announcement process unit 112 may cause the work vehicle 10 and the operation terminal 20 to announce the travel information while the work vehicle 10 is autonomously traveling along the interpolation route r31 from the travel end position G1 to the route start position Ts1 of the inter-field route R12 (see FIG. 12A).

In another embodiment, the vehicle control device 11 may keep the work vehicle 10 stopped when the operator presses down the "HOLD" button on the travel screen D4. For example, if the operator A is busy working when the work vehicle 10 is temporarily stopped, the operator A presses down the "HOLD" button (see FIG. 17, etc.) on the travel screen D4. In this case, the announcement process unit 112 waits for a command from the operator A without transferring the authority to issue the travel start command to another operator. Then if the operator A presses down the "RESUME TRAVELING" button after moving close to the work vehicle 10 and checking the safety (see FIG. 17), the travel processor 111 resumes autonomous travel of the work vehicle 10. In this way, if the operator A intends to operate to resume autonomous travel of the work vehicle 10, he/she can keep the work vehicle 10 stopped by pressing down the "HOLD" button.

In another embodiment, the vehicle control device 11 may cause the work vehicle 10 to be stopped temporarily at the route end position Te2 of the inter-field route R12 to announce the travel information. Specifically, after causing the work vehicle 10 to be stopped at the route end position Te2, the vehicle control device 11 causes the work vehicle 10 and the operation terminal 20 located in the field that can communicate with the work vehicle 10 and to announce the travel information.

As described above, the vehicle control device 11 causes the work vehicle 10 to be stopped at the end point of the inter-field route R12 (route start position Ts1 or route end position Te2) and to announce the travel information associated with traveling on the inter-field route R12. In another embodiment, the vehicle control device 11 may cause the work vehicle 10 autonomously traveling on the inter-field route R12 to temporarily stopped at an intersection of the road R0 and to announce the travel information.

In another embodiment, the vehicle control device 11 may announce the travel information to an operator at a remote location when causing the work vehicle 10 to be stopped at the end point of the inter-field route R12. For example, when the work vehicle 10 is stopped temporarily in the field F1, the announcement process unit 112 causes the operation terminal 20 of the operator being in the remote location to display the stop information and the inquiry information. In this case, the announcement process unit 112 causes the travel screen D4 to display the image P1 captured by the camera mounted on the work vehicle 10 and notifies the operator of the situation around the work vehicle 10 and the situation on the road R0. The vehicle control device 11 may prohibit the operator in the remote location from issuing a command of the autonomous travel resumption of the work vehicle 10. The vehicle control device 11 may also be configured to permit to resume autonomous travel of the work vehicle 10 when accepting the command to resume autonomous travel of the work vehicle 10 from the operator in a remote location, provided that another operator is near the work vehicle 10.

Autonomous Travel Process

Figure 24:
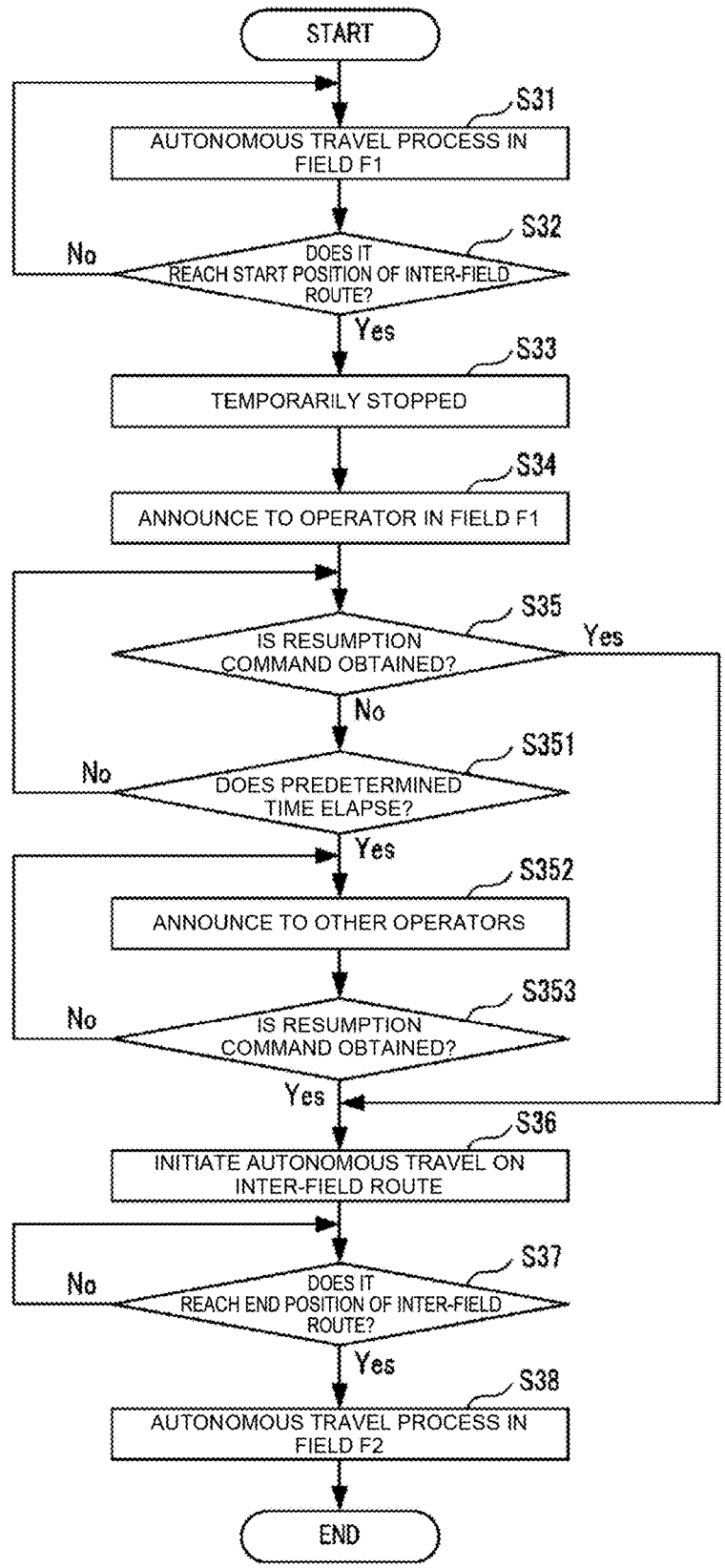
FIG. 24 is a flowchart illustrating an example of a procedure of an autonomous travel process (traveling-information announcement process) executed by the autonomous travel system according to the embodiment of the present disclosure.

FIG. 24 shows an example of an autonomous travel process (announcement process of travel information) executed by the vehicle control device 11. Here, it is assumed that the work vehicle 10 autonomously travels through the field F1, the inter-field route R12, and the field F2 (see FIG. 23) in this order.

First, in step S31, the vehicle control device 11 causes the work vehicle 10 to perform work with the work machine 14 in the field F1 while traveling autonomously following the target route R1 (see FIG. 4A).

Next, in step S32, the vehicle control device 11 determines whether or not the work vehicle 10 reaches the route start position Ts1 of the inter-field route R12. If the vehicle control device 11 determines that the work vehicle 10 reaches the route start position Ts1 of the inter-field route R12 (S32: Yes), it moves the process to step S33. On the other hand, if the vehicle control device 11 determines that the work vehicle 10 does not reach the route start position Ts1 of the inter-field route R12 (S32: No), it moves the process to step S31.

In step S33, the vehicle control device 11 causes the work vehicle to be stopped temporarily. For example, the vehicle control device 11 causes the work vehicle 10 to be stopped temporarily at the route start position Ts1 of the entrance/exit H1 (see FIG. 23).

Next, in step S34, the vehicle control device 11 announces to the operator A being in the field F1 that the work vehicle 10 is temporarily stopped. Specifically, the vehicle control device 11 causes the work vehicle 10 to audibly output the stop information (a message "TEMPORARILY STOPPED") (see FIG. 16) and causes the operation terminal 20a of the operator A to display the stop information and the inquiry information ("RESUME TRAVELING" button and "HOLD" button) (see FIG. 17).

Next, in step S35, the vehicle control device 11 determines whether or not a travel start command is obtained from the operation terminal 20. If the vehicle control device 11 determines that the travel start command is obtained from the operation terminal 20a of the operator A (S35: Yes), it moves the process to step S36. On the other hand, if the vehicle control device 11 determines that it does not obtain the travel start command from the operation terminal 20a of the operator A (S35: No), it moves the process to step S351.

In step S351, the vehicle control device 11 determines whether or not a predetermined time elapses. Specifically, the vehicle control device 11 determines whether or not the predetermined time (e.g., 5 minutes) elapses from the time when causing the work vehicle 10 and the operation terminal 20 to announce that the work vehicle 10 is temporarily stopped (or the time when the work vehicle 10 is stopped). If the vehicle control device 11 determines that the predetermined time elapses (S351: Yes), it moves the process to step S352. On the other hand, If the vehicle control device 11 determines that the predetermined time does not yet elapses (S351: No), it moves the process to step S35.

That is, if the vehicle control device 11 obtains the travel start command from the operation terminal 20a (operator A) until the predetermined time elapses from the time when causing the work vehicle 10 and the operation terminal 20 to announce that the work vehicle 10 is temporarily stopped, it moves the process to step S35. If the vehicle control device 11 does not obtain the travel start command from the operation terminal 20a (operator A) until the predetermined time elapses, it moves the process to step S352.

In step S352, the vehicle control device 11 announces to other operators that the work vehicle 10 is temporarily stopped. For example, in the example shown in FIG. 23, the vehicle control device 11 causes the operation terminal 20d of the operator D closest to the work vehicle 10 to display the inquiry information ("RESUME TRAVELING" button).

Next, in step S353, the vehicle control device 11 determines whether or not the travel start command is obtained from the operation terminal 20d. If the vehicle control device 11 determines that the travel start command is obtained from the operation terminal 20d of the operator D (S353: Yes), it moves the process to step S36. On the other hand, if the vehicle control device 11 determines that the travel start command is not obtained from the operation terminal 20d of the operator D (S353: No), it moves the process to step S352. If the operator D does not issue the travel start command (S352: No), the vehicle control device 11 announces to the operator B who is next closest to the work vehicle 10 after the operator D that the work vehicle 10 is temporarily stopped in step S352.

In this way, the vehicle control device 11 repeats the process of step S352 until it obtains the travel start command from any one of the operators close to the work vehicle 10.

At step S36, the vehicle control device 11 causes the work vehicle 10 to resume autonomous travel along the inter-field route R12. That is, the vehicle control device 11 lifts the temporarily stopped state of the work vehicle 10 at the route start position Ts1 and causes the work vehicle 10 to start traveling autonomously along the inter-field route R12 from the route start position Ts1.

Next, in step S37, the vehicle control device 11 determines whether or not the work vehicle 10 reaches the route end position Te2 of the inter-field route R12. If the vehicle control device 11 determines that the work vehicle 10 reaches the route end position Te2 of the inter-field route R12 (S37: Yes), it moves the process to step S38. On the other hand, the vehicle control device 11 causes the work vehicle 10 to continue autonomous travel along the inter-field route R12 until the work vehicle 10 reaches the route end position Te2 of the inter-field route R12 (S37: No).

In step S38, the vehicle control device 11 causes the work vehicle 10 to perform work with the work machine 14 in the field F2 while autonomously traveling along the target route R2 (see FIG. 4B). If the work vehicle 10 finishes its work in the field F2, the vehicle control device 11 ends the travel control process. As mentioned above, the vehicle control device 11 executes the autonomous travel process (announcement process of the travel information).

As explained above, the autonomous travel system 1 according to the present embodiment causes the work vehicle 10 to autonomously travel along the inter-area route (inter-field route) that is preset for a connecting road (road) that connects multiple areas (fields). Furthermore, the autonomous travel system 1 causes the work vehicle 10 to be stopped at the end points (start position or end position) of the inter-area route and to announce the travel information about travel of the inter-area route in the areas. Specifically, after the autonomous travel system 1 causes the work vehicle 10 to be stopped at the route start position Ts1 of the inter-field route R12, the autonomous travel system 1 causes the work vehicle 10 and the operation terminal 20 located in the field where the operation terminal 20 can communicate with the work vehicle 10 to announce the stop information indicating that the work vehicle 10 is stopped and the inquiry information inquiring about whether or not to resume traveling of the work vehicle 10.

This allows the operator to move to the stop position of the work vehicle 10 to visually check the safety of the surroundings of the work vehicle 10 and the safety on the road R0. The operator can also resume autonomous travel of the work vehicle 10 on the road R0 after confirming the safety. Thus, it is possible to cause the work vehicle 10 to travel autonomously between multiple fields with safety and work efficiency in the work vehicle 10 improved.

Drive Process of Drive Source

Meanwhile, if none of the operators issues the travel start command while the work vehicle 10 is temporarily stopped, it is concerned that the work vehicle 10 remains stopped and does not initiate autonomous travel on the road R0. The autonomous travel system 1 according to the present embodiment is configured to be able to improve safety and work efficiency in the work vehicle 10 that travels autonomously between multiple fields.

For example, the autonomous travel system 1 causes the work vehicle 10 to initiate autonomous travel on the road R0 (inter-field route R12) if a predetermined condition is met after the work vehicle 10 is temporarily stopped.

Specifically, the travel processor 111 causes the work vehicle 10 to initiate autonomous travel along the inter-field route R12 if an operator is within a predetermined distance from the work vehicle 10 in the field F1 corresponding to the stop position of the work vehicle 10.

For example, when the vehicle control device 11 detects that the operator gets on the work vehicle 10, the travel processor 111 causes the work vehicle 10 to initiate autonomous travel along the inter-field route R12. The vehicle control device 11 may determine whether or not the operator gets on the work vehicle 10 by means of a sensor installed in the driver's seat of the work vehicle 10. The vehicle control device 11 may also acquire position information of the operation terminal 20 and determine whether or not the operator having the operation terminal 20 gets on the work vehicle 10 based on the position information.

In this way, even when the work vehicle 10 is temporarily stopped at the route start position Ts1 in the field F1 and the operator does not issue the travel resumption command, the travel processor 111 causes the work vehicle 10 to resume autonomous travel if it detects that the operator gets on the work vehicle 10. This allows the work vehicle 10 to quickly resume autonomous travel by the operator getting on the work vehicle 10. The vehicle control device 11 may be switchable to a manual travel mode when the operator gets on the work vehicle 10. In the manual travel mode, the operator may be able to manually steer the work vehicle, or may be able to operate to only change the speed of the work vehicle.

Figure 25:
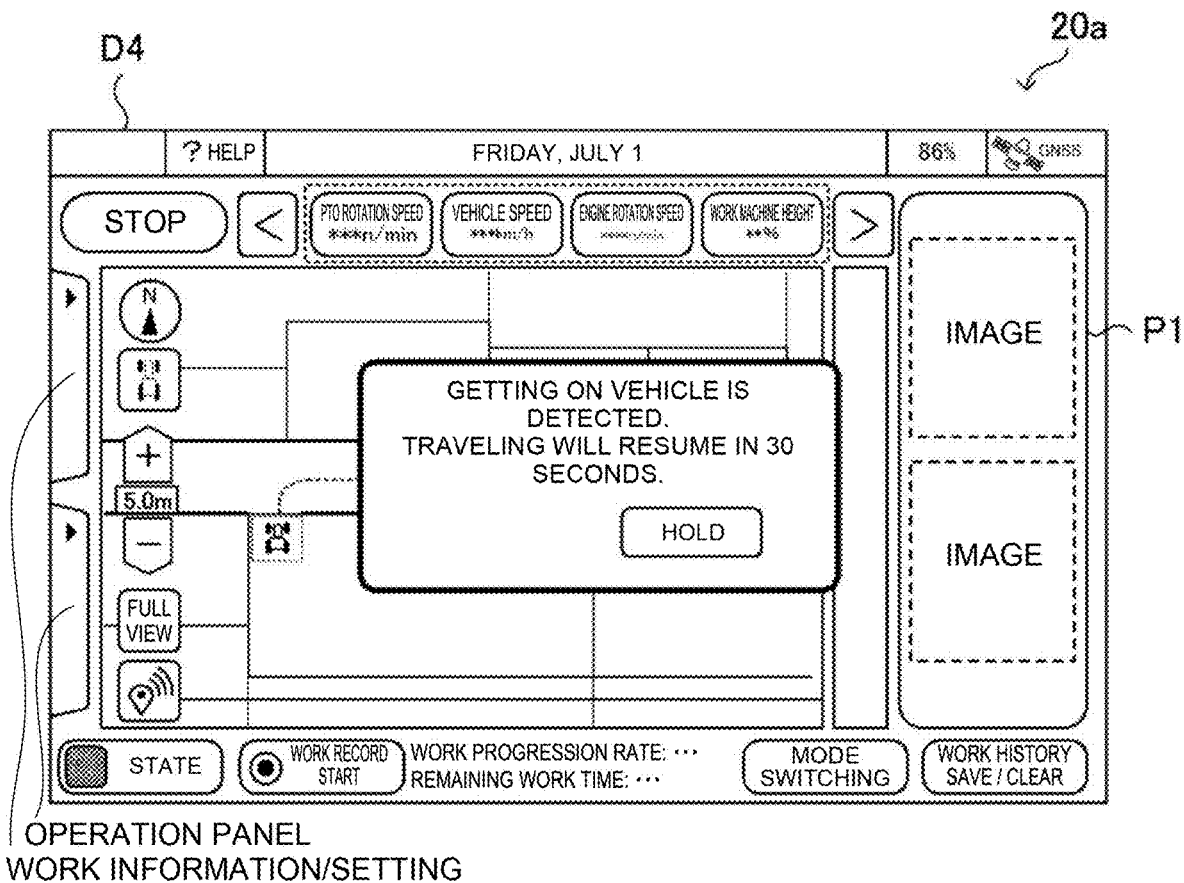
FIG. 25 is a diagram illustrating another example of the travel screen of the operation terminal according to the embodiment of the present disclosure.

The travel processor 111 may also cause the work vehicle 10 to initiate autonomous travel along the inter-field route R12 after a predetermined time elapses after the vehicle control device 11 detects the operator within a predetermined distance from the work vehicle 10. For example, the travel processor 111 causes the work vehicle 10 to initiate autonomous travel after 30 seconds pass after the vehicle control device 11 detects the operator. As shown in FIG. 25, the announcement process unit 112 may also cause the operation terminal 20 of the operator A to announce that the vehicle control device 11 detects the operator and causes the work vehicle 10 to initiate autonomous travel after a predetermined time elapses (e.g., 30 seconds). The operator who is within a predetermined distance from the work vehicle 10 and the operator who gets on the work vehicle 10 may be the operator A managing the field F1, other operator, monitor, worker, or the like.

If the operator A presses down the "HOLD" button on the travel screen D4 shown in FIG. 25, the travel processor 111 does not cause the work vehicle 10 to initiate autonomous travel, but to keep the temporarily stopped state. For example, if the operator A desires to check the safety of the work vehicle 10 by oneself, the operator A presses down the "HOLD" button on the travel screen D4 shown in FIG. 25. In this case, the travel processor 111 does not resume autonomous travel even if it detects an operator getting on the work vehicle 10, but keeps the stopped state.

In another embodiment, the travel processor 111 may cause the work vehicle 10 to initiate autonomous travel along the inter-field route R12 when the operation terminal 20 is located within a predetermined distance from the work vehicle 10. For example, if the operation terminal 20 is located within a few meters (e.g., 3 meters) from the work vehicle 10, the operator can visually check the safety of the road R0. As a result, the travel processor 111 lifts the temporarily stopped state of the work vehicle 10 and causes the work vehicle 10 to resume autonomous travel along the inter-field route R12 from the route start position Ts1. That is, in the present disclosure, the travel processor 111 permits the work vehicle 10 to resume autonomous travel when the operator gets on the work vehicle 10 or when the operator is within a predetermined distance from the work vehicle 10.

In another embodiment, if the vehicle control device 11 detects an operator within a predetermined distance from the work vehicle 10 until the predetermined time elapses after the work vehicle 10 is stopped, the travel processor 111 may cause the work vehicle 10 to initiate autonomous travel along the inter-field route R12. If the vehicle control device 11 does not detect an operator within a predetermined distance from the work vehicle 10 until a predetermined time elapses after the work vehicle 10 is stopped, the drive process unit 113 may cause the drive source of the work vehicle 10 to be stopped.

For example, if none of the operators issues the travel start command while the work vehicle 10 is temporarily stopped, in addition to that, if there is no operator near the work vehicle 10 (or no operator gets on the work vehicle 10), the engine 131 is kept in operation and thus wasting fuel. Therefore, the drive process unit 113 causes the engine 131 to be stopped when the temporarily stopped state of the work vehicle 10 continues for a predetermined period of time (e.g., 10 minutes). This allows unnecessary consumption of fuel to be reduced.

If the engine 131 is stopped while the work vehicle 10 is temporarily stopped at the entrance/exit H1, the work vehicle interferes with entry/exit of other vehicles. If the entrance/exit H1 is sloped, the work vehicle 10 is stopped in an inclined posture. Therefore, the drive process unit 113 may cause the engine 131 to be stopped after moving the work vehicle 10 from the route start position Ts1 (stop position) at the entrance/exit H1 to a predetermined position in the field F1. For example, the drive process unit 113 causes the engine 131 to be stopped after moving the work vehicle 10 to a flat place in the field F1 near the entrance/exit H1.

Figure 26:
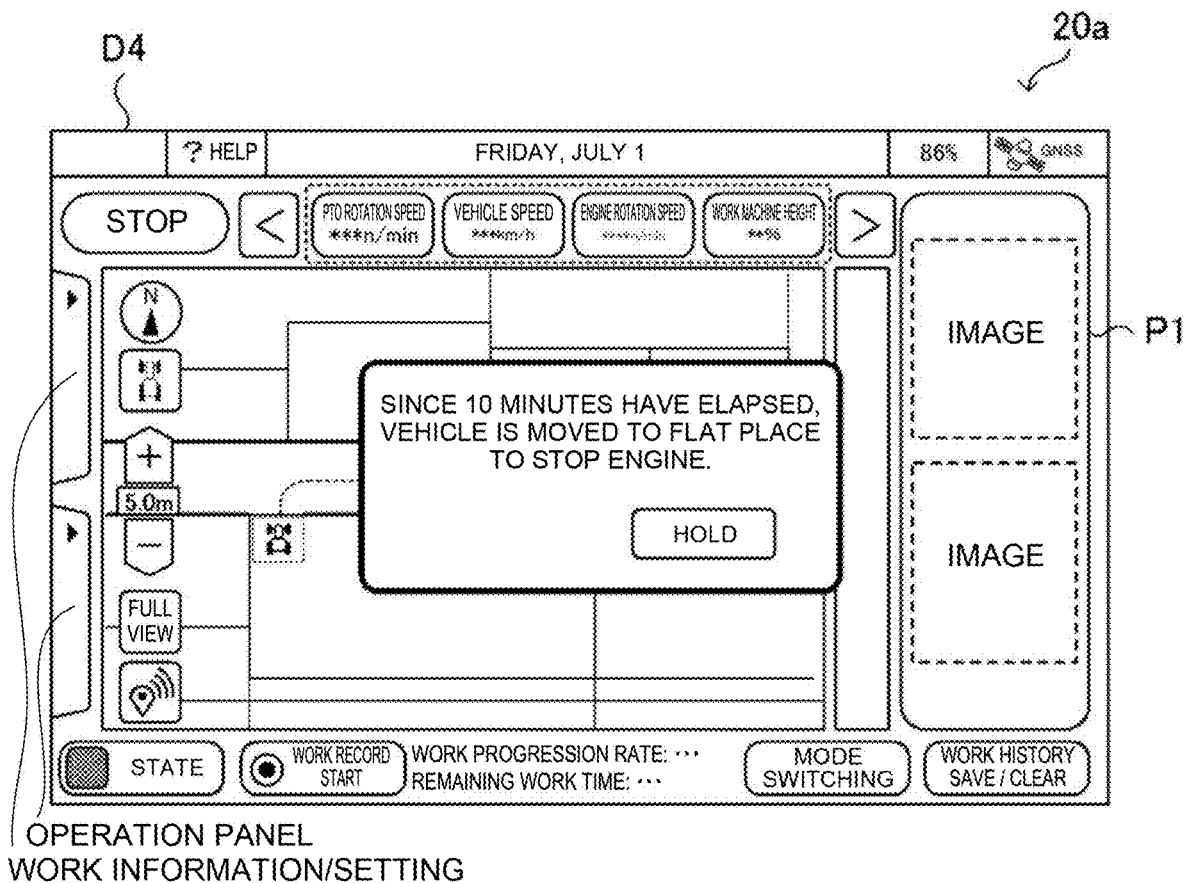
FIG. 26 is a diagram illustrating another example of the travel screen of the operation terminal according to the embodiment of the present disclosure.

When the engine 131 of the work vehicle 10 is to be stopped, the announcement process unit 112 causes the travel screen D4 to display a message indicating that the engine 131 is to be stopped, as shown in FIG. 26. When the operator A presses down the "HOLD" button on the travel screen D4 shown in FIG. 26, the drive process unit 113 does not stop the engine 131 but keeps the operating state thereof. For example, the operator A presses down the "HOLD" button on the travel screen D4 shown in FIG. 26 when he/she can move to the stop position of the work vehicle 10.

Figure 27:
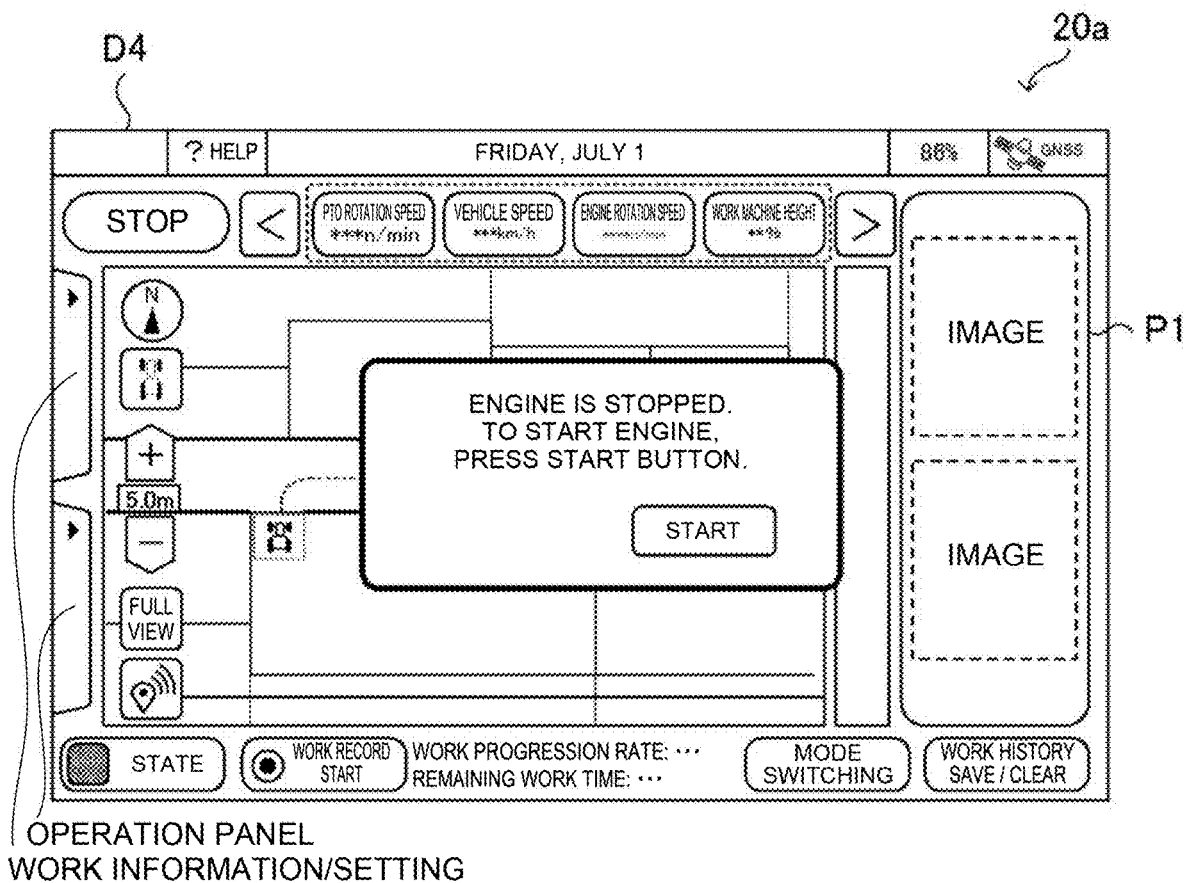
FIG. 27 is a diagram illustrating another example of the travel screen of the operation terminal according to the embodiment of the present disclosure.

Furthermore, when the drive process unit 113 causes the engine 131 to be stopped, the announcement process unit 112 causes the travel screen D4 to display a message indicating that the engine 131 is stopped and a "START" button to start the engine 131, as shown in FIG. 27. This allows the operator to know that the engine 131 is stopped. The operator can also restart the engine 131 at the operation terminal 20. The drive process unit 113 causes the engine 131 to resume the operation when accepting operation to restart the engine 131 from the operation terminal 20 that can communicate with the work vehicle 10 after causing the engine 131 of the work vehicle 10 to be stopped.

The announcement process unit 112 may cause the travel screen D4 to display a "START" button when the operation terminal 20 is located within the predetermined distance from the work vehicle 10. This allows the engine 131 to be permitted to resume operation, provided that the operator can visually confirm the safety of the work vehicle 10. The announcement process unit 112 may also cause the work vehicle 10 to audibly output a message (e.g., "START THE ENGINE") indicating that the engine 131 is to be started when the engine 131 is started.

If the work machine 14 is such a work machine, such as a sprayer that sprays chemicals, that continuous operation by the drive source (engine 131) is needed, the drive process unit 113 continuously drives the drive source while the work vehicle 10 is stopped. This allows the work vehicle 10 to perform work (spraying operation) soon after the work vehicle 10 moves from the field F1 to the field F2, for example. In this way, the drive process unit 113 may decide whether or not to stop the engine 131 after the work vehicle 10 is temporarily stopped, depending on a work content.

In another embodiment, the vehicle control device 11 may cause the work vehicle 10 to resume autonomous travel into the field F2 when it detects an operator located within a predetermined distance from the work vehicle 10 after temporarily stopping the work vehicle 10 at the route end position Te2 of the inter-field route R12.

The drive source of the present disclosure is not limited to the engine 131, but may also be a drive motor that drives the work machine 14.

Autonomous Travel Process

Figure 28:
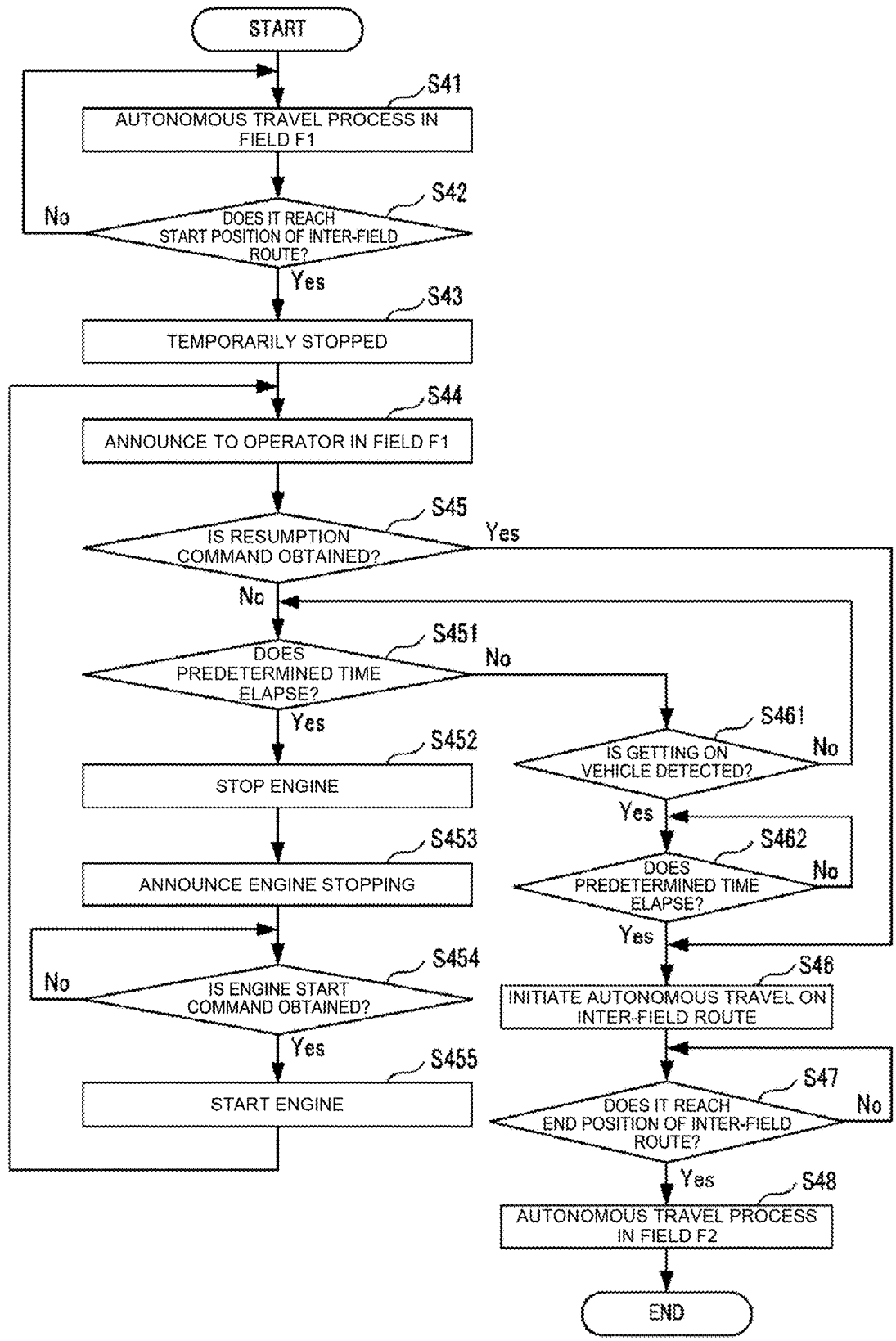
FIG. 28 is a flowchart illustrating an example of a procedure of an autonomous travel process (driving-source drive process) executed by the autonomous travel system according to the embodiment of the present disclosure.

FIG. 28 shows an example of an autonomous travel process (drive process of the drive source) executed by the vehicle control device 11. Here, it is assumed that the work vehicle 10 autonomously travels through the field F1, the inter-field route R12, and the field F2 (see FIG. 23) in this order.

First, in step S41, the vehicle control device 11 causes the work vehicle 10 to perform work with the work machine 14 in the field F1 while causing the work machine to travel autonomously along the target route R1 (see FIG. 4A).

Next, in step S42, the vehicle control device 11 determines whether or not the work vehicle 10 reaches the route start position Ts1 of the inter-field route R12. If the vehicle control device 11 determines that the work vehicle 10 reaches the route start position Ts1 of the inter-field route R12 (S42: Yes), it moves the process to step S43. On the other hand, if the vehicle control device 11 determines that the work vehicle 10 does not reach the route start position Ts1 of the inter-field route R12 (S42: No), it moves the process to step S41.

In step S43, the vehicle control device 11 causes the work vehicle to be stopped temporarily. For example, the vehicle control device 11 causes the work vehicle 10 to be stopped temporarily at the route start position Ts1 of the entrance/exit H1 (see FIG. 23).

Next, in step S44, the vehicle control device 11 announces to the operator A being in the field F1 that the work vehicle 10 is temporarily stopped. Specifically, the vehicle control device 11 causes the work vehicle 10 to audibly output the stop information (a message "TEMPORARILY STOPPED") (see FIG. 16) and causes the operation terminal 20*a* of the operator A to display the stop information and the inquiry information ("RESUME TRAVELING" button and "HOLD" button) (see FIG. 17).

Next, in step S45, the vehicle control device 11 determines whether or not a travel start command is obtained from the operation terminal 20. If the vehicle control device 11 determines that the travel start command is obtained from the operation terminal 20*a* of the operator A (S45: Yes), it moves the process to step S46. On the other hand, if the vehicle control device 11 determines that it does not obtain the travel start command from the operation terminal 20*a* of the operator A (S45: No), it moves the process to step S451.

In step S451, the vehicle control device 11 determines whether or not a predetermined time elapses. Specifically, the vehicle control device 11 determines whether or not the predetermined time (e.g., 10 minutes) elapses from the time when causing the work vehicle 10 and the operation terminal 20 to announce that the work vehicle 10 is temporarily stopped (or the time when the work vehicle 10 is stopped). If the vehicle control device 11 determines that the predetermined time elapses (S451: Yes), it moves the process to step S452. On the other hand, If the vehicle control device 11 determines that the predetermined time does not yet elapses (S451: No), it moves the process to step S461.

In step S461, the vehicle control device 11 determines whether or not the operator gets on the work vehicle 10. If the vehicle control device 11 detects that the operator gets on the work vehicle 10 that is temporarily stopped (S461: Yes), it moves the process to step S462. On the other hand, if the vehicle control device 11 does not detect that the operator gets on the work vehicle 10 that is temporarily stopped (S461: No), it moves the process to step S451.

In other words, the vehicle control device 11 moves the process to step S462 if it detects that the operator gets on the work vehicle 10 until a predetermined time elapses from the time when causing the work vehicle 10 and the operation terminal 20 to announce that the work vehicle 10 is temporarily stopped, and the vehicle control device 11 moves the process to step S452 if it does not detect that the operator gets on the work vehicle 10 until the predetermined time elapses.

In step S462, the vehicle control device 11 determines whether or not the predetermined time elapses. Specifically, the vehicle control device 11 determines whether or not the predetermined time (e.g., 30 seconds) elapses from the time when the vehicle control device 11 detects that the operator gets on the work vehicle 10. If the vehicle control device 11 determines that the predetermined time elapses (S462: Yes), it moves the process to step S46. The vehicle control device 11 waits until the predetermined time elapses (S462: No).

When the vehicle control device 11 detects that the operator gets on the work vehicle 10, it causes the travel screen D4 to display that the operator getting on the work vehicle 10 is detected and that the work vehicle 10 initiates autonomous travel after the predetermined time (e.g., 30 seconds) elapses (see FIG. 25).

In contrast, in step S452, the vehicle control device 11 causes the engine 131 of the work vehicle 10 to be stopped. The vehicle control device 11 may cause the engine 131 to be stopped at the route start position Ts1 where the work vehicle 10 is temporarily stopped, or may cause the engine 131 to be stopped after moving the work vehicle 10 to a flat place in the field F1 near the entrance/exit H1. The vehicle control device 11 causes the travel screen D4 to display that the engine 131 is to be stopped (see FIG. 26).

Next, in step S453, the vehicle control device 11 notifies the operator that the engine 131 is stopped. For example, as shown in FIG. 27, the vehicle control device 11 causes the travel screen D4 to display that the engine 131 is stopped and a "START" button to start the engine 131.

Next, in step S454, the vehicle control device 11 determines whether or not it obtains a command to start the engine 131 from the operation terminal 20. When the operator presses down the "START" button on the travel screen D4, the vehicle control device 11 obtains a start command of the engine 131. Upon the vehicle control device 11 obtains the start command of the engine 131 (S454: Yes), it moves the process to step S455. The vehicle control device 11 waits until obtaining the start command of the engine 131 (S454: No). The operator may start the engine 131 on the travel screen D4, or may start the engine 131 by getting on the work vehicle 10 to operate the engine key.

In step S455, if the vehicle control device 11 causes the engine 131 to start, it moves the process to step S44. In step S44, the vehicle control device 11 notifies again the operator that the work vehicle 10 is temporarily stopped, and upon obtaining a travel resumption command from the operator (S45: Yes), the vehicle control device 11 moves the process to step S46.

In this way, the vehicle control device 11 repeats the above mentioned process until it obtains the travel resumption command from the operator.

At step S46, the vehicle control device 11 causes the work vehicle 10 to resume autonomous travel along the inter-field route R12. That is, the vehicle control device 11 lifts the temporarily stopped state of the work vehicle 10 at the route start position Ts1 and causes the work vehicle 10 to initiate autonomous travel along the inter-field route R12 from the route start position Ts1.

Next, in step S47, the vehicle control device 11 determines whether or not the work vehicle 10 reaches the route end position Te2 of the inter-field route R12. If the vehicle control device 11 determines that the work vehicle 10 reaches the route end position Te2 of the inter-field route R12 (S47: Yes), it moves the process to step S48. On the other hand, the vehicle control device 11 causes the work vehicle 10 to continue autonomous travel along the inter-field route R12 until the work vehicle 10 reaches the route end position Te2 of the inter-field route R12 (S47: No).

In step S48, the vehicle control device 11 causes the work vehicle 10 to perform work with the work machine 14 in the field F2 while autonomously traveling along the target route R2 (see FIG. 4B). If the work vehicle 10 finishes its work in the field F2, the vehicle control device 11 ends the travel control process. As mentioned above, the vehicle control device 11 executes the autonomous travel process (drive process of the drive source).

As explained above, the autonomous travel system 1 according to the present embodiment causes the work vehicle 10 to autonomously travel along the inter-area route (inter-field route) that is preset for a connecting road (road) that connects multiple areas (fields). Furthermore, the autonomous travel system 1 causes the work vehicle 10 to be stopped at the end point (start position or end position) of the inter-area route and causes the work vehicle 10 to resume autonomous travel when the user is within a predetermined distance from the work vehicle 10 in the area corresponding to the stop position of the work vehicle 10. Specifically, the autonomous travel system 1 causes the work vehicle 10 to initiate autonomous travel along the inter-field route R12 when the work vehicle 10 detects that the operator gets on the work vehicle 10 after the work vehicle 10 is stopped at the route start position Ts1 of the inter-field route R12.

This allows an event, in which, for example, the work vehicle 10 keeps stopped at the entrance/exit H1 of the field F1 and does not initiate autonomous travel when the work vehicle 10 is going to travel autonomously on the road R0 along the inter-field route R12, to be avoided. According to the configuration, in which provided that the operator gets on the vehicle, autonomous travel is resumed, the safety of the work vehicle 10 and the safety on the road R0 can be surely confirmed. Thus, it is possible to cause the work vehicle 10 to travel autonomously between multiple fields efficiently.

The vehicle control device 11 does not execute the stopping process of the engine 131 even if the work vehicle 10 is stopped when the work vehicle 10 is performing work in the field, but permits to execute the stopping process of the engine 131 when the work vehicle 10 finishes work in the field and is stopped at the route start position Ts1.

The autonomous travel system 1 according to the present embodiment may execute both the announcement process of the travel information mentioned above and the drive process of the drive source, or it may execute only one of those processes.

Figure 29:
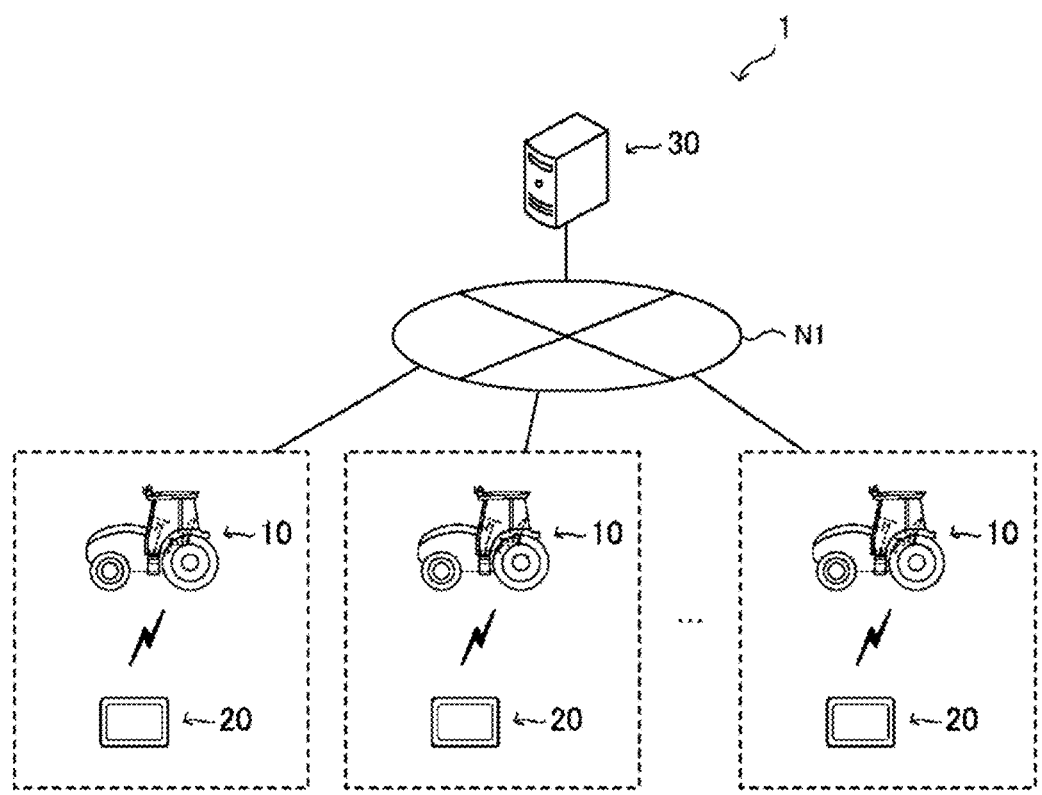
FIG. 29 is a block diagram illustrating another configuration of the autonomous travel system according to the embodiment of the present disclosure.

In the embodiment described above, single work vehicle 10 is configured to be able to communicate with multiple operation terminals 20, and the work vehicle 10 is configured to announce the stop information (the travel information) of the work vehicle 10 and operator detection information to the predetermined operation terminal 20. The present disclosure is not limited to the above mentioned configuration, for example, as shown in FIG. 29, a server 30 (e.g., a cloud server) may integrally control a plurality of work vehicles 10 and a plurality of operation terminals 20 that can respectively communicate with the plurality of work vehicles 10. For example, when the server 30 identifies the work vehicle 10 that is stopped at the route start position Ts1 of the inter-field route R12, the server 30 identifies the operation terminal 20 that manages the work vehicle 10 and one or more operation terminals located near the work vehicle 10 to cause them to announce the travel information (FIGS. 20 to 22). Furthermore, the server 30 identifies the work vehicle 10 that is stopped at the route start position Ts1 of the inter-field route R12, when it is detected that the operator gets on the work vehicle 10 or that the engine 131 of the work vehicle 10 is stopped, the server 30 causes the operation terminal 20 that manages the work vehicle 10 to announce detection information (FIGS. 25 to 27).

As described above, in the embodiment described above, the work vehicle 10 corresponds to the autonomous travel system of the present disclosure, but the autonomous travel system of the present disclosure may also be composed of the server 30 alone. The autonomous travel system of the present disclosure may be configured to include the work vehicle 10 and the operation terminal 20, or may be configured to include the work vehicle 10, the operation terminal 20, and the server 30.

APPENDICES TO THE FIRST DISCLOSURE

Supplementary notes will now be provided for summary of the invention extracted from each embodiments related to the announcement process mentioned above. Configurations and processing functions described in additional remarks below may be selected and combined as appropriate.

Appendix 1

An autonomous travel method for causing a work vehicle to autonomously travel along an inter-area route preset for a connecting road connecting multiple areas, the method including causing the work vehicle to be stopped at an end point of the inter-area route.

Appendix 2

The autonomous travel method according to appendix 1 further including announcing travel information associated with travel of the inter-area route in the area.

Appendix 3

The autonomous travel method according to appendix 2, wherein the announcing includes causing the work vehicle and an operation terminal located in the area that can communicate with the work vehicle to announce the travel information after causing the work vehicle to be stopped at a start point of the inter-area route.

Appendix 4

The autonomous travel method according to appendix 2 or 3, wherein the travel information includes at least one of stop information indicating that the work vehicle is stopped and inquiry information inquiring about whether or not to resume traveling of the work vehicle, and the announcing further includes: causing the work vehicle to audibly output the stop information; and causing the operation terminal to display the stop information and the inquiry information.

Appendix 5

The autonomous travel method according to appendix 4, wherein the causing is performed when the work vehicle is stopped, and the causing the operation terminal to display the inquiry information is performed when the operation terminal is within a predetermined distance from the work vehicle.

Appendix 6

The autonomous travel method according to appendix 4 or 5 further including causing the work vehicle to initiate autonomous travel along the inter-area route when a travel resumption command is obtained from the operation terminal in response to the inquiry information.

Appendix 7

The autonomous travel method according to any one of appendices 4 to 6 further including: causing a first operation terminal located in an area that is connected to the inter-area route to display the stop information and the inquiry information; and causing a second operation terminal located in an area that is not connected to the inter-area route to display the stop information.

Appendix 8

The autonomous travel method according to appendix 7 further including causing the second operation terminal to further display the inquiry information when the travel resumption command is not obtained from the first operation terminal.

Appendix 9

The autonomous travel method according to appendix 7 or 8, wherein the causing includes causing the second operation terminal determined based on a priority among a plurality of second operation terminals to display the inquiry information.

Appendix 10

The autonomous travel method according to any one of appendices 7 to 9, wherein the causing includes causing the second operation terminal closest to the work vehicle among the plurality of second operation terminals to display the inquiry information.

APPENDICES TO THE SECOND DISCLOSURE

Supplementary notes will now be provided for summary of the invention extracted from each embodiments related to the drive process mentioned above. Configurations and processing functions described in additional remarks below may be selected and combined as appropriate.

Appendix 1

An autonomous travel method for causing a work vehicle to autonomously travel along an inter-area route preset for a connecting road connecting multiple areas, the method including causing the work vehicle to be stopped at an end point of the inter-area route.

Appendix 2

The autonomous travel method according to appendix 1 further including causing the work vehicle to resume autonomous travel when a user is within a predetermined distance from the work vehicle in the area corresponding to a stop position of the work vehicle.

Appendix 3

The autonomous travel method according to appendix 2 further including causing the work vehicle to initiate autonomous travel along the inter-area route when it is detected that the user gets on the work vehicle.

Appendix 4

The autonomous travel method according to appendix 2 or 3, wherein the causing is performed when it is detected that the user is within the predetermined distance from the work vehicle until a predetermined time elapses after the work vehicle is stopped.

Appendix 5

The autonomous travel method according to any one of appendices 2 to 4 further including causing a drive source of the work vehicle to be stopped when it is not detected that the user is within the predetermined distance from the work vehicle until the predetermined time elapses after the work vehicle is stopped.

Appendix 6

The autonomous travel method according to any one of appendices 2 to 5 further including causing a drive source of the work vehicle to be stopped after causing the work vehicle to move from the stop position to a predetermined position in the area when it is not detected that the user is within the predetermined distance from the work vehicle until the predetermined time elapses after the work vehicle is stopped.

Appendix 7

The autonomous travel method according to appendix 6, wherein the predetermined position is a flat place near an entrance/exit of the area.

Appendix 8

The autonomous travel method according to any one of appendices 5 to 7 further including causing the drive source to be continuously driven while the work vehicle is stopped when a work machine installed in the work vehicle is such a work machine that continuous operation by the drive source is needed.

Appendix 9

The autonomous travel method according to any one of appendices 5 to 8 further including causing the drive source to resume operation when manipulation to resume operation of the drive source is accepted from an operation terminal that can communicate with the work vehicle, after the drive source of the work vehicle is stopped.

REFERENCE SIGNS LIST

1: Autonomous travel system
10 Work vehicle
11: Vehicle control device
14: Work machine
20 Operation terminal
30: Server
111: Travel processor
112: Announcement process unit
113: Drive process unit
211: Setting process unit
212: Reception process unit
213: Acquisition process unit
214: Generation process unit
215: Output process unit
F1: Field
F2: Field
G1: Travel end position
G2: Travel end position
H1: Entrance/exit
H2: Entrance/exit
R0: Road (connecting road)
R1: Target route
R2: Target route
R12: Inter-field route (inter-area route)
S1: Travel start position
S2: Travel start position
Ts1: Route start position (start point)
Te2: Route end position (end point)
r31: Interpolation route
r32: Interpolation route

The invention claimed is:

1. An autonomous travel method for causing a work vehicle to autonomously travel along an inter-area route preset for a connecting road that connects multiple areas that are each adjacent the connecting road, the autonomous travel method comprising:
causing the work vehicle to be stopped at an end point of the inter-area route, wherein the end point is within an area of the multiple areas.

2. The autonomous travel method according to claim 1, further comprising:
announcing travel information associated with travel of the inter-area route in an area of the multiple areas.

3. The autonomous travel method according to claim 2, wherein the travel information is announced in the work vehicle and an operation terminal located in the area that can communicate with the work vehicle, after the work vehicle is caused to be stopped at a start point of the inter-area route.

4. The autonomous travel method according to claim 3, wherein:
the travel information includes at least one of stop information indicating that the work vehicle is stopped or inquiry information inquiring about whether or not to resume traveling of the work vehicle,
the work vehicle is caused to audibly output the stop information, and
the operation terminal is caused to display the stop information and the inquiry information.

5. The autonomous travel method according to claim 4, wherein:
the stop information is displayed on the operation terminal based on the work vehicle being stopped, and
the inquiry information is displayed on the operation terminal based on the operation terminal being within a predetermined distance from the work vehicle.

6. The autonomous travel method according to claim 4, further comprising:
causing the work vehicle to initiate autonomous travel along the inter-area route based on a travel resumption command obtained from the operation terminal in response to the inquiry information.

7. The autonomous travel method according to claim 6, further comprising:
causing a first operation terminal located in an area that is connected to the inter-area route to display the stop information and the inquiry information; and
causing a second operation terminal located in an area that is not connected to the inter-area route to display the stop information.

8. The autonomous travel method according to claim 7, further comprising:
causing the second operation terminal to further display the inquiry information based on the travel resumption command not being obtained from the first operation terminal.

9. The autonomous travel method according to claim 8, wherein the second operation terminal determined based on a priority among a plurality of second operation terminals is caused to display the inquiry information.

10. The autonomous travel method according to claim 9, wherein the second operation terminal closest to the work vehicle among the plurality of second operation terminals is caused to display the inquiry information.

11. The autonomous travel method according to claim 1, further comprising:
causing the work vehicle to resume autonomous travel based on a user being within a predetermined distance from the work vehicle in an area corresponding to a stop position of the work vehicle.

12. The autonomous travel method according to claim 11, further comprising:
causing the work vehicle to initiate autonomous travel along the inter-area route based on detection that the user gets on the work vehicle.

13. The autonomous travel method according to claim 11, wherein the work vehicle is caused to resume autonomous travel based on detection of the user being within the predetermined distance from the work vehicle until a predetermined time elapses after the work vehicle is stopped.

14. The autonomous travel method according to claim 13, further comprising:
causing a drive source of the work vehicle to be stopped after causing the work vehicle to move from the stop position to a predetermined position in the area based on the user not being within the predetermined distance from the work vehicle until the predetermined time elapses after the work vehicle is stopped.

15. The autonomous travel method according to claim 14, wherein the predetermined position is a flat place near an entrance/exit of the area.

16. The autonomous travel method according to claim 11, further comprising:
causing a drive source of the work vehicle to be stopped based on the user not being within the predetermined distance from the work vehicle until a predetermined time elapses after the work vehicle is stopped.

17. The autonomous travel method according to claim 16, further comprising:
causing the drive source to be continuously driven while the work vehicle is stopped based on a work machine being in the work vehicle is such a work machine that needs to be continuous operated by the drive source.

18. The autonomous travel method according to claim 16, further comprising:
causing the drive source to resume operation based on manipulation to resume operation of the drive source being accepted from an operation terminal that can communicate with the work vehicle, after the drive source of the work vehicle is stopped.

19. An autonomous travel system for causing a work vehicle to autonomously travel along an inter-area route preset for a connecting road that connects multiple areas that are each adjacent the connecting road, the autonomous travel system comprising:

a travel processor configured to cause the work vehicle to be stopped at an end point of the inter-area route, wherein the end point is within an area of the multiple areas.

20. A non-transitory, computer-readable storage medium having stored thereon an autonomous travel program that, when executed by one or more processors, causes the one or more processors to perform operations comprising:

causing a work vehicle to autonomously travel along an inter-area route preset for a connecting road that connects multiple areas that are each adjacent the connecting road;

causing the work vehicle to be stopped at an end point of the inter-area route, wherein the end point is within an area of the multiple areas.

* * * * *